United States Patent
Liu et al.

(10) Patent No.: US 8,145,761 B2
(45) Date of Patent: Mar. 27, 2012

(54) LOAD SKEWING FOR POWER-AWARE SERVER PROVISIONING

(75) Inventors: Jie Liu, Sammamish, WA (US); Lin Xiao, Redmond, WA (US); Jeremy Eric Elson, Kirkland, WA (US); Suman Kumar Nath, Redmond, WA (US); Leonidas Rigas, Kirkland, WA (US); Feng Zhao, Issaquah, WA (US); Gong Chen, Los Angeles, CA (US); Wenbo He, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/041,487

(22) Filed: Mar. 3, 2008

(65) Prior Publication Data

US 2009/0222562 A1    Sep. 3, 2009

(51) Int. Cl.
*G06F 15/173* (2006.01)

(52) U.S. Cl. ...................................................... 709/226

(58) Field of Classification Search .................. 709/203, 709/223, 227, 226
See application file for complete search history.

(56) References Cited

U.S. PATENT DOCUMENTS

| | | | |
|---|---|---|---|
| 6,601,084 B1 | 7/2003 | Bhaskaran et al. | |
| 6,606,643 B1 * | 8/2003 | Emens et al. | 709/203 |
| 6,658,473 B1 | 12/2003 | Block et al. | |
| 6,795,928 B2 * | 9/2004 | Bradley et al. | 713/320 |
| 6,880,156 B1 * | 4/2005 | Landherr et al. | 718/105 |
| 6,985,952 B2 * | 1/2006 | Bohrer et al. | 709/226 |
| 6,993,571 B2 | 1/2006 | Kistler | |
| 6,996,615 B1 * | 2/2006 | McGuire | 709/226 |
| 7,054,931 B1 * | 5/2006 | Candan et al. | 709/226 |
| 7,296,050 B2 * | 11/2007 | Vicard | 709/201 |
| 8,051,174 B2 * | 11/2011 | Xiao et al. | 709/226 |
| 2003/0055969 A1 * | 3/2003 | Begun et al. | 709/226 |
| 2003/0115495 A1 * | 6/2003 | Rawson, III | 713/324 |
| 2003/0204759 A1 * | 10/2003 | Singh | 713/320 |
| 2003/0225904 A1 * | 12/2003 | Kanno et al. | 709/232 |
| 2004/0107273 A1 * | 6/2004 | Biran et al. | 709/223 |
| 2005/0102400 A1 * | 5/2005 | Nakahara et al. | 709/225 |
| 2006/0069780 A1 * | 3/2006 | Batni et al. | 709/226 |
| 2006/0230407 A1 * | 10/2006 | Rosu et al. | 718/105 |
| 2007/0130341 A1 * | 6/2007 | Ma | 709/226 |
| 2008/0147787 A1 * | 6/2008 | Wilkinson et al. | 709/203 |
| 2009/0106571 A1 * | 4/2009 | Low et al. | 713/310 |
| 2009/0187782 A1 * | 7/2009 | Greene et al. | 713/340 |

OTHER PUBLICATIONS

Moore, Justin et al. "Making Scheduling 'Cool': Temperature-Aware Workload Placement in Data Centers", Proceedings of the Annual Conference on USENIX, 2005. pp. 1-14.*

(Continued)

*Primary Examiner* — John Follansbee
*Assistant Examiner* — Imad Hussain
(74) *Attorney, Agent, or Firm* — Zete Law, P.L.L.C.; MacLane C. Key

(57) ABSTRACT

The claimed subject matter provides a system and/or a method facilitates energy-aware connection distribution among a plurality of servers in a cluster. A set of busy servers in the cluster can be provided that each handle a high number of connections. In addition, a set of tail servers in the cluster can be managed that each maintain a low number of connections. A load skewing component gives priority to at least a subset of the set of busy servers when dispatching new connection requests from a plurality of users. In addition, the load skewing component controls the number of tail servers to maintain a sufficient number for energy-aware operation.

18 Claims, 15 Drawing Sheets

OTHER PUBLICATIONS

Rajamani, Karthick and Lefurgy, Charles. On Evaluating Request-Distribution Schemes for Saving Energy in Server Clusters. IEEE International Symposium on Performance Analysis of Systems and Software (ISPASS'03), Mar. 2003. pp. 1-12.*

Elnozahy, E.N. (Mootaz) et al. Energy-Efficient Server Clusters. PACS 2002, LNCS 2325. 2003. pp. 179-197 (1-19).*

Li, Ta-Hsin. "A Hierarchical Framework for Modeling and Forecasting Web Server Workload". Sep. 2005. Journal of the American Statistical Association. vol. 100, No. 471. pp. 1-16 (748-763).*

Jeffery S. Chase, et al., "Managing Energy and Server Resources in Hosting Centers," Department of Computer Science Duke University, 14 pages, http://www.cs.duke.edu/ari/publications/muse.pdf.

Bhuvan Urgaonkar, et al., "Dynamic Provisioning of Multi-tier Internet Applications," 12 pages, http://www.cse.psu.edu/~bhuvan/papers/ps/ICAC05.pdf.

Mamuro Yokoyama, Hiroshi Yazawa, "Provisioning Technology for Automation", Jan. 17, 2007, pp. 325-333 http://www.fujitsu.com/downloads/MAG/vol43-3/paper10.pdf.

* cited by examiner

LOAD SKEWING FOR POWER-AWARE SERVER PROVISIONING

BACKGROUND

As computing technology advances, people incorporate such technology more and more into daily life. Cell phones, smart phones, personal digital assistants, computers, laptops, and other smart devices are pervasive in today's world. Moreover, the Internet has become a global establishment that is omnipresent in the lives of many people. The Internet, in one aspect, is utilized a global communications medium through which humans interact for the purposes of business, education and/or frivolity. In addition, the Internet can be employed as a means to retrieve information retained all over the globe. To these ends, a plurality of Internet services is available to facilitate interactions, communications and/or information retrievals via the Internet. For example, such services can include, but not limited to, search engines, web mail, online chat (e.g., instant messaging), virtual environments and/or online games (e.g., massively multi-player online role playing games, multi-player games, etc.).

Many Internet services have become integrated into everyday lives of people. To accommodate increased integration, such services are expected to scale well, to provide high performance (e.g., low latency), and to be readily available. To achieve these goals, Internet services are typically deployed in clusters that include a large number of servers hosted in dedicated data centers. A data center can house a variety of heterogeneous components such as, but not limited to, computers, storage, networking equipment. In addition, the data center includes infrastructure that distributes power to the components and provides cooling to the components.

Viewed from outside, a data center can be seen as a black box that responds to a stream of user requests via the Internet while consuming power from the electrical grid and producing waste heat. With drastic increases in demand for Internet services, data centers consume more and more resources. The amount of resources consumed is directly related to number of hosted servers in data center as well workload of the servers. As data centers scale up to meet demand for hosted services, electricity usage skyrockets. In the United States, it is estimated that billions of kilowatt-hours are consumed by data centers; an amount sufficient to power millions of homes.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The subject innovation relates to systems and/or methods that facilitate dispatching connection load among a plurality of servers in a server cluster that deploys a network service (e.g., online messaging service, multimedia conferencing service, virtual online environments, multi-player games, etc). According to an aspect of the subject innovation, a load skewing mechanism is provided that maintains a number of tail servers so that changing a number of active servers in the cluster does not affect login pattern (e.g., mitigates service not available errors following server initiated disconnections caused by shutting down servers). For example, a majority of total connection load of the cluster can be aggregated to a relatively small number of servers in the cluster. These busy servers can retain a number of connections close to a maximum allowable limit. The number of tail servers can keep a small number of connections so that the tail servers are available to handle request surges or other connection build ups. In addition, a tail server can be shut down to conserve energy without generating a decrease in service quality for a large number of users.

In accordance with another aspect, a load skewing component is provided that attempts to dispatch new connection requests to busy servers first. The load skewing component amasses a majority of user connections to a small set of busy servers and maintains the set of busy servers at or close to a target load. If there are no busy servers available to handle additional load, the load skewing component can dispatch connections to the tail servers until capacity becomes available on the busy servers.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
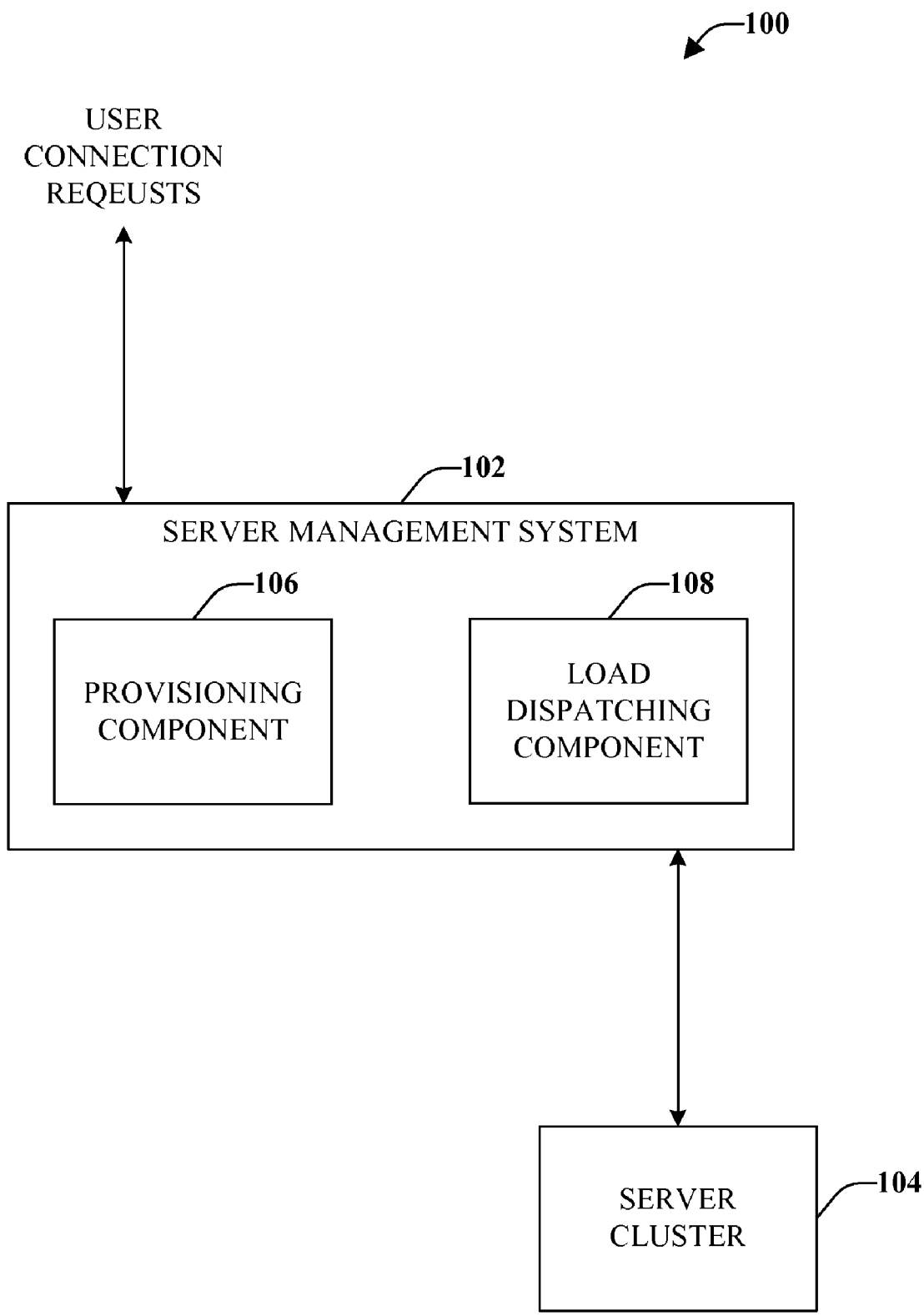
FIG. 1 illustrates a block diagram of an exemplary system that facilitates provisioning servers and dispatching user load in an energy efficient manner.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a data center management system 100 that facilitates provisioning servers and dispatching user load among the servers in a cluster. The system 100 is energy-aware such that energy consumption of the cluster is reduced. The system 100 can include a server management component 102 that directs a plurality of servers in a cluster and/or data center 104. The cluster 104 includes a plurality of servers that implement and provide one or more network services. According to an aspect, the network services can be Internet services conveyed via the Internet and can include web services, search engines, web mail, instant messaging, online games, virtual environments, supercomputer tasks, and the like. In one embodiment, the cluster 104 deploys connection intensive services that maintain long-lived connections with logged in users.

The server management component 102 obtains user connection requests from one or more users (not shown). The user connection requests can be login requests or any other requests to access and consume an Internet service implemented by the cluster. The server management component 102 outputs server assignment information, among other things, to the cluster 104. Server assignment information includes one or more assignments of a particular user request to a particular server in the cluster 104. A user corresponding to the particular user request establishes a connection with the particular server assigned to access and/or to utilize the Internet service.

The server management component 102 includes a provisioning component 106 that determines a number of servers within the cluster 104 that should be active. The provisioning component 106 can start up and/or shut down servers in the cluster 104 to maintain the determined number of servers. Pursuant to an illustration, the determined number of servers can be a minimum number of servers required to satisfy a level of quality of service for the Internet service. The level of quality of service can be application-specific to the Internet service provided by the cluster 104. For example, a virtual environment service or multi-player online game can require a higher level (e.g., more reliable connection, low latency, etc.) than an instant messaging service. The level of quality of service relates in part to the connection load on servers in the cluster 104. As connection load increases on a fixed number of servers, the servers are less able to accept new connections and less able to provide sufficient resources to users.

The provisioning component 106 adds a margin in the number of servers provisioned to account for short-term demand and inaccurate forecasts of future demand. The provisioning component 106 can employ a model of resource utilization of a server to define a maximum login rate and a maximum number of connections for each server in the cluster 104. Accordingly, a minimum number of servers, without an added margin, can be provided by the following:

$$K(t) = \max\left\{\left\lceil \frac{L_{tot}(t)}{L_{max}} \right\rceil, \left\lceil \frac{N_{tot}(t)}{N_{max}} \right\rceil\right\}$$

Pursuant to this illustration, $L_{tot}(t)$ and $N_{tot}(t)$ denote total login rate and total number of connections for the cluster 104 at any given time t and $L_{max}$ and $N_{max}$ are the defined maximum login rate and maximum number of connections, respectively, per server. The notation $\lceil x \rceil$ indicates a smallest integer that is larger than or equal to x. According to an aspect, K(t) is calculated on a regular basis (e.g., every half hour). Typically, to be beneficial, K(t) is calculated ahead of time (e.g., prior to time t) based upon forecasted values of $L_{tot}(t)$ and $N_{tot}(t)$. Forecasting these values can be inaccurate because provisioning can require turning on servers (e.g., cool starting) in the cluster 104 to accommodate anticipated load increase. Lead time between the time a server is started and the time the server is available is significant as new connection requests arrive in the interim. Moreover, while waking servers up from a sleep mode requires less time, uncertainty remains due to short-term load fluctuation.

In addition, K(t) as provided by the above illustration, assumes that connection requests can easily be immediately dispatched to a new server. However, a dynamic relationship between login and number of connections typically prevents a server from instantaneously accepted a maximum number of connections once started. The number of connections of a particular server increases gradually according to the maximum login rate of the server. Thus, the provisioning component 106 accounts for dynamic behavior through the addition of a margin in determining a number of servers to provision in accordance to the following:

$$K(t) = \max\left\{ \left\lceil \gamma_L \frac{L_{tot}(t)}{L_{max}} \right\rceil, \left\lceil \gamma_N \frac{N_{tot}(t)}{N_{max}} \right\rceil \right\}$$

Pursuant to this example, $\gamma_L$ and $\gamma_N$ are multiplicative factors for the login rate and number of connections, respectively, The multiplicative factors can be greater than one to introduce a margin in the number of servers to provision K(t). Selection of multiplicative factors is important. If the factors are selected at values that are too high, the provisioning component 106 over provisions leading to inefficient energy savings. If the factors are selected too low, the provisioning component 106 is under provisioning resulting in poor quality of service.

The provisioning component 106 provides evaluation of forecasting accuracy and analysis of dynamic behavior resulting from load dispatching. To this end, the multiplicative factors can be split based upon the following:

$$\gamma_L = \gamma_L^{frc} \gamma_L^{dyn}, \gamma_N = \gamma_N^{frc} \gamma_N^{dyn}$$

Pursuant to this illustration, the superscript, frc, denotes contribution of forecasting factors to the overall multiplicative factors. The forecasting factors are employed to compensate for forecasting inaccuracy. The superscript, dyn, denotes contribution of dynamic factors to the multiplicative factors. The dynamic factors compensate for dynamic behaviors resulting from load dispatching. The provisioning component 106 determines both forecasting factors and dynamic factors to generate the resultant multiplicative factors, $\gamma_L$ and $\gamma_N$.

The server management component 102 includes a load dispatching component 108 that allocates incoming user connection requests to a server in the cluster 104. The load dispatching component 108 assigns user connection requests to servers provisioned or turned on by the provisioning component 106. The load dispatching component 108 can employ a plurality of dispatching algorithms such as, but not limited to, load balancing, load skewing and the like. In load balancing, the load dispatching component 108 attempts to make numbers of connections on servers in the cluster 104 the same. In load skewing, the load dispatching component 108 assigns new user connection requests to busy servers in the cluster 104 first until a threshold is met.

In addition, the system 100 can include any suitable and/or necessary interfaces (not shown), which provides various adapters, connectors, channels, communication paths, etc. to integrate the server management component 102, the server cluster 104, the provisioning component 106 and the load dispatching component 108 into virtually any operating and/or database system(s) and/or with one another. In addition, the interfaces can provide various adapters, connectors, channels, communication paths, etc., that provide for interaction with the in situ the server management component 102, the server cluster 104, the provisioning component 106, the load dispatching component 108 and any other device and/or component associated with the system 100.

Dynamic provisioning and load dispatching are typically employed with request-response services (e.g., web servers). For example, web server transactions are typically short. Further, there is no state to carry over when a total number of servers changes. Pursuant to an illustration, in the context of request-response services, a minimum number of servers sufficient to handle the current request rate is determined. After the minimum number of servers have been activated, incoming requests are distributed evenly among the servers.

Connection intensive Internet services maintain long-lived connections to logged in users. For connection intensive Internet services, a total number of connections on a server is provided by an integral of a net login rate (e.g., gross login rate minus logout rate) over the time in which the server has been active. Power consumption of the server is a function of a variety of factors that include, but are not limited to, number of active connections and login rate. Unlike request-response servers that serve short-lived transactions, connection intensive servers present unique characteristics.

A connection server is a server that implements a connection intensive Internet service(s). A connection server's capacity is usually constrained by a rate at which it can accept new connections as well as a total number of active connections in the server. In addition, a maximum tolerable connection rate is typically smaller than the total number of active connections due to expensive connection setup procedures, conservative service level agreements, etc. Accordingly, when a new server is turned on, it cannot be fully utilized immediately as with request-response servers. Further, when a server with active connections is turned off, users can experience a short period of disconnection. Client software often tries to reconnect which causes a surge of new connection requests from those users previously connected to the turned off server. When the number of active servers fails to accommodate the surge of new requests, users can experience service non available (SNA) errors. In connection intensive Internet services, energy cost of maintaining a connection is orders of magnitude smaller than processing a new connection request. Accordingly, a provisioning algorithm should be aware that turning off a server with a large number of connections can create a surge in reconnection requests. The surge can consume energy beyond the savings generated by turning off the server.

Figure 2:
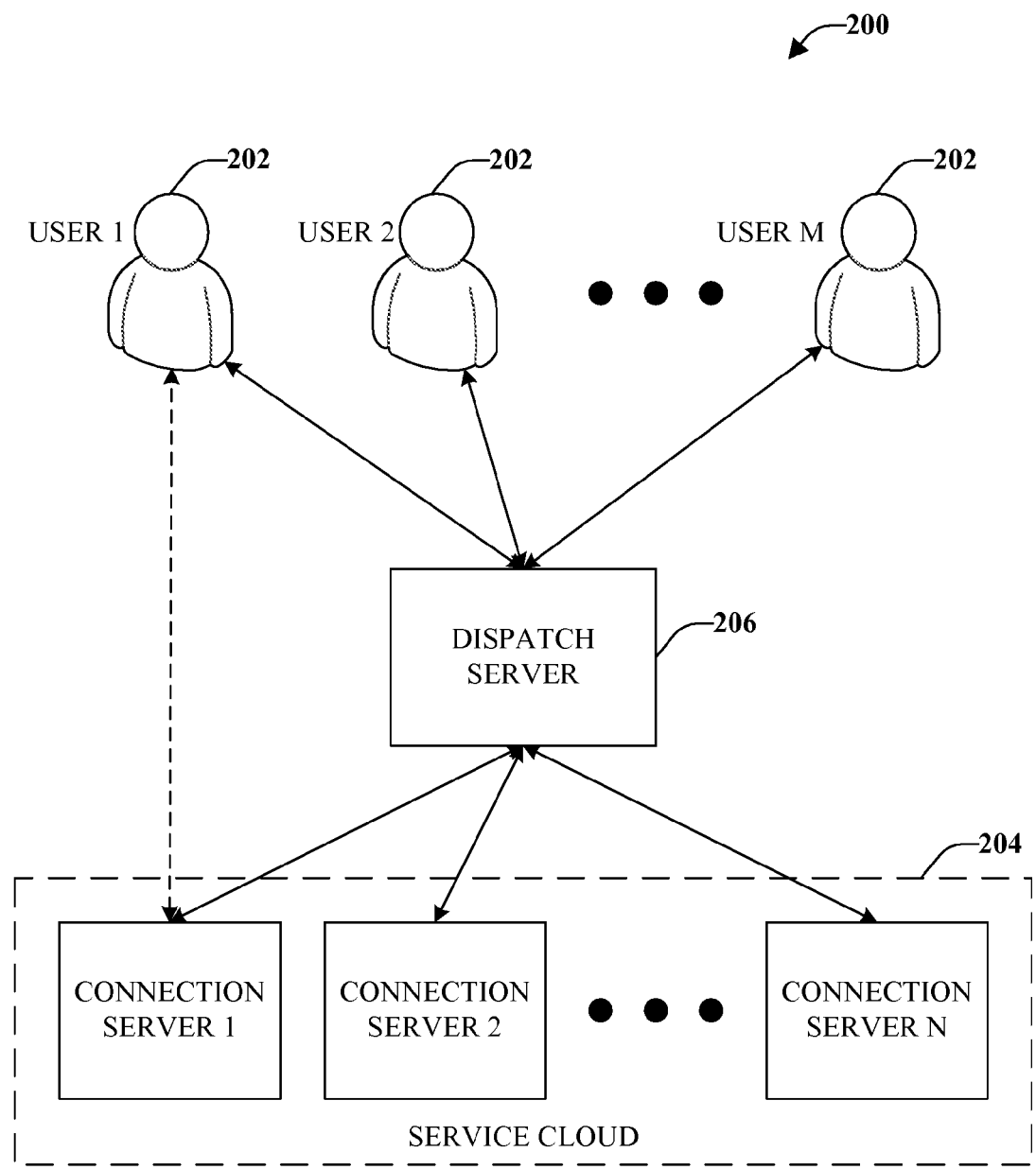
FIG. 2 illustrates a block diagram of an exemplary system that provides connection-intensive network services.

Turning briefly to FIG. 2, an exemplary front door architecture 200 for a connection intensive Internet service is depicted. The connection intensive Internet service can include an online messaging service, a multimedia conferencing service, a virtual life service, a multi-user video game, etc. A plurality of users 202 can issue login requests to a service cloud 204 via dedicated clients, browser applets or the like. The plurality of users 202 can comprise M users where M is any integer greater than or equal to one. Similarly, the service cloud can include a cluster of N connections servers where N is an integer greater than or equal to one. The login requests issued from the plurality of users 202 are received by a dispatch server 206 that determines which connection server from the service cloud 204 handles which login request. The dispatch server 206 can employ a load dispatching algorithm such as, but not limited to, a load balancing algorithm and/or a load skewing algorithm. Pursuant to an illustration, the dispatch server 206 assigns a particular connection server from the service cloud 204 to a given login request from the plurality of users 202. For example, the dispatch server 206 can assign connection server 1 from the service cloud 204 to a login request issued by user 1. After the assignment, the dispatch server 206 returns an IP address associated with connection server 1 to user 1. User 1 then employs the returned IP address to establish a direct connection with connection server 1. Connection server 1 can authenticate user 1 by communicating with an authentication server (not shown) and, if user 1 is authorized, maintain a live TCP connection until user 1 logs off. The TCP connection can be utilized to update user status (e.g., online, busy, off line, etc.) and direct activity traffic, such as chat messages and/or multimedia conferencing information to backend servers (not shown) that provide additional processing.

At an application level, the connection servers in the service cloud 204 are subject to two major constraints: maximum login rate and maximum number of connections (e.g. sockets) that can be hosted. A login rate, L, is defined as the number of new connection requests a connection server can process in a second. A limit, $L_{max}$, is imposed to protect the connection server and other backend servers from being overloaded and/or entering unsafe operational regions. A limit, $N_{max}$, is imposed to restrict the number of TCP connections in a connection server. The limit is determined based upon considerations of memory constraints and fault tolerance concerns. For example, a connection server can maintain a connection with minimal utilization of a processor but the connection requires a certain amount of memory. In addition, a connection server that crashes immediately disconnects all users. Typical, these users attempt to reconnect resulting a surge of new connection requests hitting the service cloud 204. With the aforementioned limit on login rate, not all reconnect requests can be processed in a short period of time. This causes undesirable user experiences.

Returning to FIG. 1, the provisioning component 106 and load dispatching component 108 can be configured to account for properties of connection intensive services. Based upon the foregoing, conventional provisioning and load dispatching mechanisms designed for request-response services are not optimized for connection intensive Internet services. For example, a reactive provisioning mechanism can dynamically turns on or off servers based on a current number of users and balance load among all active servers evenly. Since a connection server can take time T to be fully utilized, provisioning X servers based on current users is not always sufficient. Pursuant to an illustration, a newly booted server requires time T to gain a target load. During time T, the service has fewer fully utilized servers than required. Moreover, after time T of turning on X new servers, workload can change significantly. The workload change can make the X new servers insufficient or unnecessary. Further, a server with N active connections can be turned off abruptly when an average connected users per server is low. A resultant surge in reconnection requests can be beyond capacity of available servers. Accordingly, reactive provisioning mechanisms can cause poor quality of service and/or create instability.

The provisioning component 106 provides proactive provisioning mechanisms that consider transient behavior of the cluster 104. Pursuant to an illustrative embodiment, the provisioning component 106 can employ effective load prediction to turn on servers gradually prior to a time in which the servers are needed. In addition, the provisioning component 106 can avoid turning off unnecessary servers so that such servers are available to cope with temporary spikes in load. Additionally, the provisioning component 106 interacts with the load dispatching component 108 to anticipate side effects of changing server numbers, changing server load, etc. In one embodiment, the load dispatching component 108 skews connection load on servers instead of balancing load. The skewed load produces a set of tail servers that maintain a fewer number of connections and a small set of busy servers that maintain a large number of connections. The set of tail servers can be turned off by the provisioning component 106 without generating a large number of reconnect requests. Moreover, as connection load is concentrated in a small set of busy servers, tails servers that are unnecessary (e.g., not needed in reserve to cope with load spikes) can be turned off to save energy. In addition, the set of tail servers can be available to accommodate unexpected surges in new connection requests.

Figure 3:
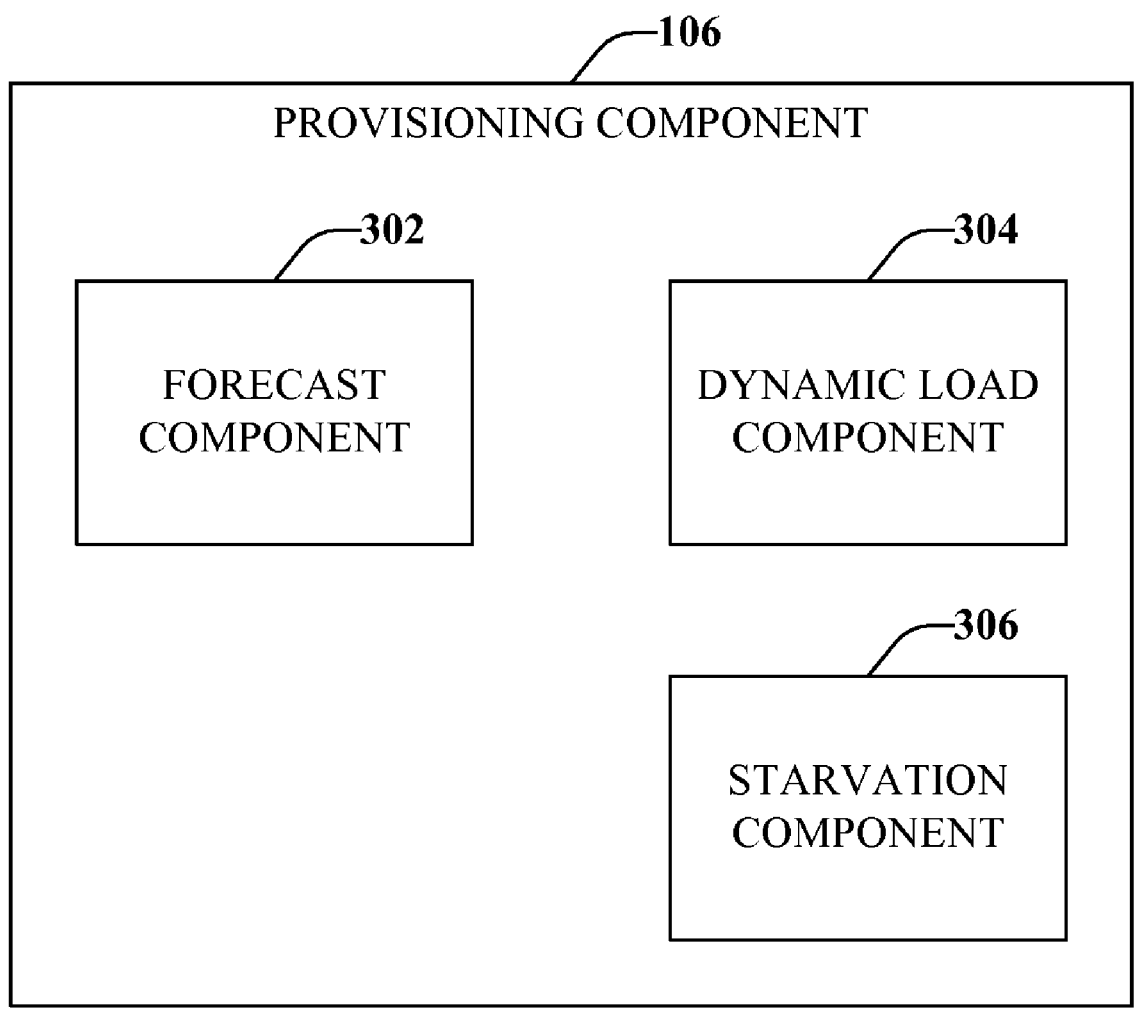
FIG. 3 illustrates a block diagram of an exemplary system that depicts a representative provisioning component.

FIG. 3 illustrates a representative provisioning component 106 that can be utilized in a connection intensive Internet service to turn on servers according to demand or turn off servers to conserve energy in a cluster deployed for the service. The provisioning component 106 includes a forecast component 302 and a dynamic load component 304. The forecast component 302 evaluates forecast factors that can be utilized in determining the multiplicative factors employed in the provisioning mechanism. Pursuant to an illustrative embodiment, the forecast component 302 determines the forecast factors, $\gamma_L^{frc}$ and $\gamma_N^{frc}$ employed by the provisioning component 106 to ascertain a number of servers required to maintain a service.

Figure 4:
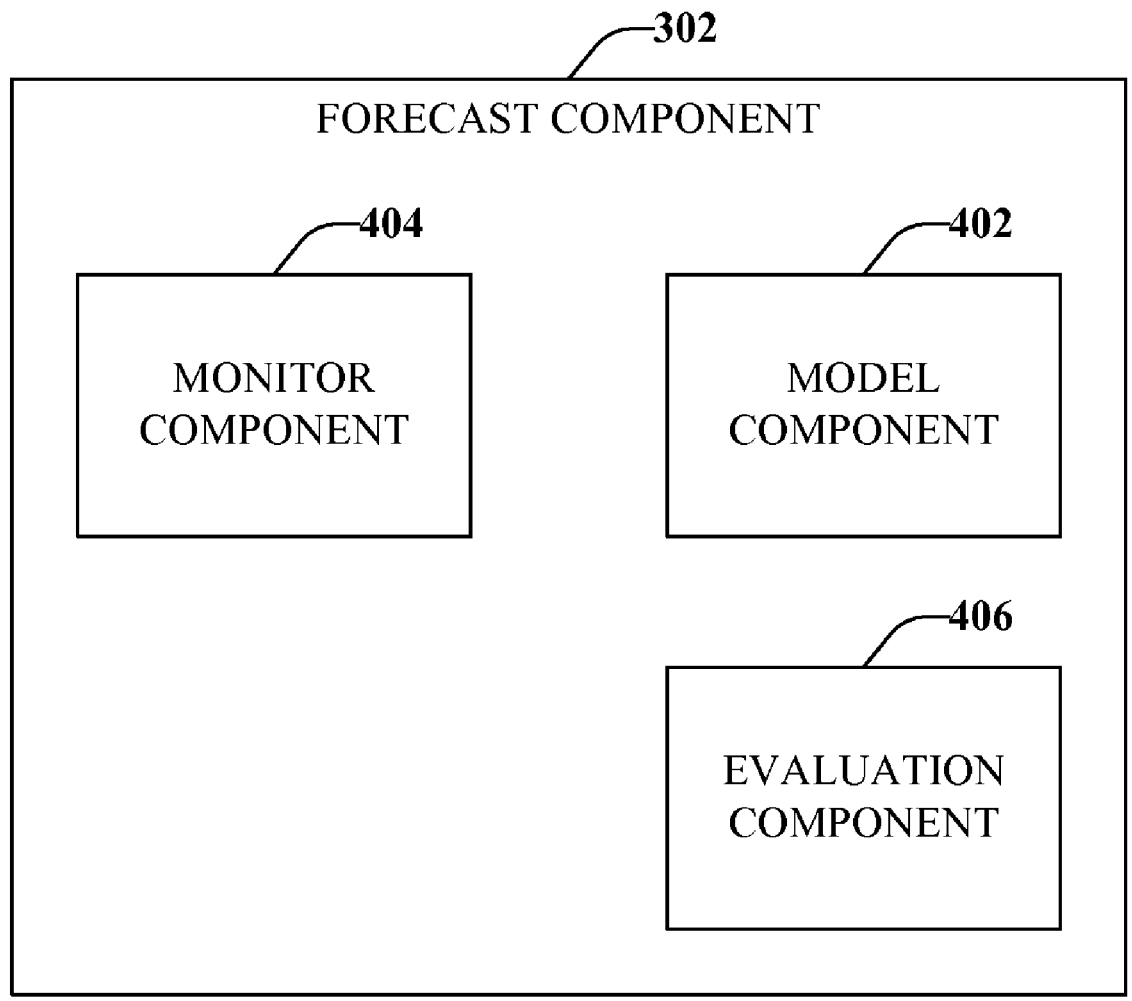
FIG. 4 illustrates a block diagram of an exemplary system that depicts a representative forecast component.

Referring to FIG. 4, a representative forecast component 302 is illustrated in accordance with an aspect of the subject disclosure. The forecast component 302 determines forecast factors utilized to determine a number of servers to provision for an Internet service. The forecast component 302 can include a model component 402 that generates and maintains a model of server load. The model of server load can be employed by the forecast component 302 for short-term load forecasting. According to an aspect, the model is a sparse periodic auto-regression model. Short-term forecasting typically relates to forecasting over a period between a half-hour to a several hours, for example. In one embodiment, the model component 402 utilizes a stochastic periodic time series with a specified time unit to represent the sparse periodic auto-regression model. The stochastic periodic time series can represent $L_{tot}(t)$ and $N_{tot}(t)$ as described supra.

Connection load on servers utilized in connection intensive Internet services demonstrates a seasonal characteristic. The servers can have periodic components in terms of hours, days, weeks and months. In addition, the servers can have long-term growth trends. For a periodic component with a period T (e.g., hours, days, weeks, months etc.), the model component 402 can determine a predicted value y(t) at some time t, based upon all previous actual measurements according to the following:

$$y(t) = \sum_{k=1}^{n} a_k y(t-kT) + \sum_{j=1}^{m} b_j \Delta y(t-j)$$

$$\Delta y(t-j) = y(t-j) - \frac{1}{n}\sum_{k=1}^{n} y(t-j-kT)$$

Pursuant to this illustration, the stochastic periodic time series, y(t) includes two components. The component with the parameter $\alpha_k$ provides periodic prediction while the component that includes the parameter $b_j$ provides local adjustment. In addition, the integers n and m are respective orders of the two components.

The forecast component 302 includes a monitor component 404 that measures login rate and connection amount of servers in a cluster. The monitor component 404 can provide actual measurements to the model component 402 to develop and/or refine the sparse periodic auto-regression model. The monitor component 404 can measure login rate and connection amount at intervals similar to the forecasting term (e.g., half-hour, one hour, etc.) to generate a set of samples. The forecast component 302 further includes an evaluation component 406 that ascertains the forecast factors, $\gamma_L^{frc}$ and $\gamma_N^{frc}$, based at least in part on the sparse periodic auto-regression model and the actual measured values.

Pursuant to an illustrative embodiment, the model component 402 applies actual measurements provided by the monitor component 404 to the model and the underlying stochastic periodic time series. In accordance with the actual measurements, the evaluation component 406 determines values for the parameters $\alpha_k$ and $b_j$ to fully develop the sparse periodic auto-regression model. According to an aspect, the evaluation component 406 can employ a least squares fitting technique.

The model component 402 can employ the fully developed sparse periodic auto-regression model to provide predictions on login rate and connection amount for servers in the cluster at a future time t. In addition, the monitor component 406 can continue to measure actual values of login rate and connection amount for the servers. The evaluation component 406 compares the predicted values and the observed values to generate the forecast factors. The evaluation component 406 calculates error between the predicted values and observed values. Relative errors between observed values and predicted values can be provided by the following:

$$Err_L = \frac{\hat{L}(t) - L(t)}{L(t)}$$

$$Err_N = \frac{\hat{N}(t) - N(t)}{N(t)}$$

In this example, $\hat{L}(t)$ and $\hat{N}(t)$ are the predicted values of the login rate and number of connections, respectively. The values $L(t)$ and $N(t)$ are actual observed values. The standard deviations of the relative errors of the login rate and the number of connections are computed and employed by the evaluation component 406 to determine the forecast factor according to the following:

$$\gamma_L^{frc} = 1 + 3\sigma_L$$

$$\gamma_N^{frc} = 1 + 3\sigma_N$$

Pursuant to this illustration, $\sigma_L$ is standard deviation of the relative errors between observed login rate and predicted login rate and $\sigma_N$ is the standard deviation of the error between predicted and observed number of connections.

Referring back to FIG. 3, the forecast factors can be utilized by the provisioning component 106 to determine a number of servers in a cluster required to handle connection load at a given time. The forecast factors are employed in connection with dynamic factors to generate overall multiplicative factors. The provisioning component 106 includes a dynamic load component 304 that analyzes dynamic behaviors resulting as side effects of load dispatching mechanisms. Based at least in part on the analysis, the dynamic load component 304 evaluates dynamic factors $\gamma_L^{dyn}$ and $\gamma_N^{dyn}$ that can be combined with the forecast factors or with hysteresis-based provisioning to ascertain a required number of servers.

The dynamic factors for login rate and number of connections depend upon the dispatching mechanism employed by the load dispatching component 108. For example, a load balancing mechanism and a load skewing mechanism lead to different load distributions among the active servers in a cluster. In addition, the different mechanisms have varying implications in terms of energy savings and server initiated disconnections.

Figure 5:
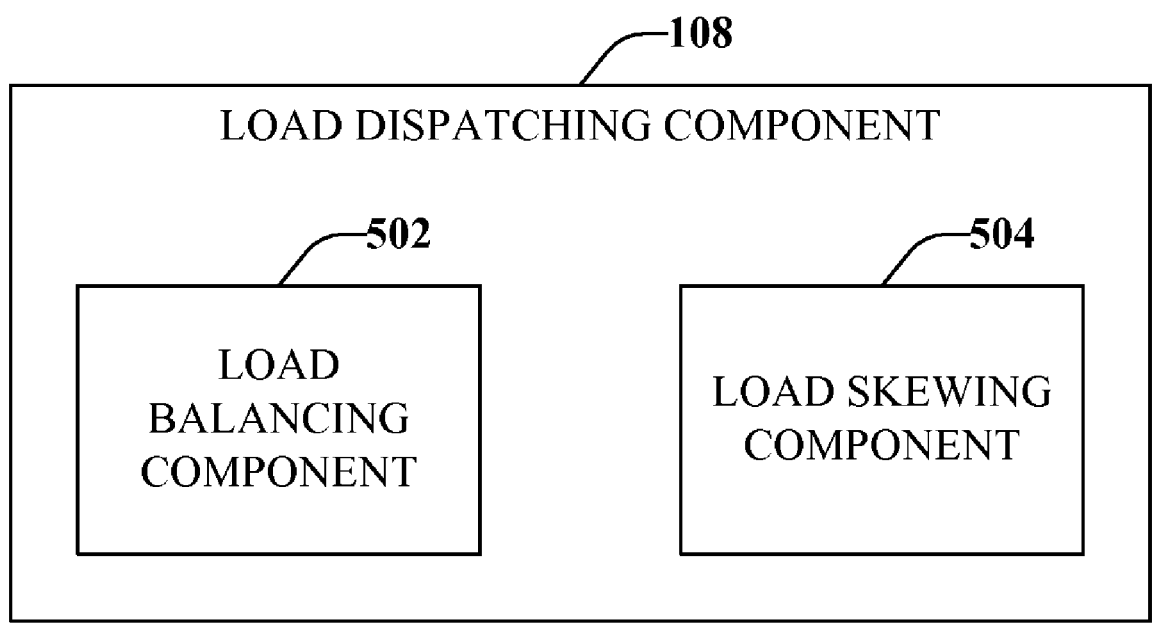
FIG. 5 illustrates a block diagram of an exemplary system that depicts a representative load-dispatching component.

Turning to FIG. 5, illustrated is a representative load dispatching component 108 that assigns incoming connection requests from users to connection servers in a service cluster. The load dispatching component 108 includes a load balancing component 502 that provides a load balancing mechanism and a load skewing component 504 that provides a load skewing mechanism. A dynamic model of the load dispatching system can be based upon a discrete time model where t denotes time with a specified unit. In an illustrative embodiment, the specified unit can be smaller than the unit employed in forecasting; for example, it can be on the order of a few seconds.

A number of active servers in the cluster during an interval between time t and t+1 can be represented by K(t). Dynamics of connection load of an individual server in the cluster can be provided by the following first order difference equation:

$$N_i(t+1) = N_i(t) + L_i(t) - D_i(t)$$

Pursuant to this illustration, $N_i(t)$ represents the number of connection of server i at time t. $L_i(t)$ and $D_i(t)$ represent the number of login and departures, respectively, of users for server i between time t and time t+1. In addition, integer i can be any integer between 1 and K(t).

In one embodiment, the load dispatching component 108 distributes a total number of incoming login requests $L_{tot}(t)$ to the available K(t) servers. According to an aspect, the load dispatching component 108 determines $L_i(t)$ for each server i. Pursuant to an illustration a load dispatching mechanism can be expressed as:

$$L_i(t) = L_{tot}(t) p_i(t) \; i = 1, \ldots, K(t)$$

In this example, $p_i(t)$ represents a portion or fraction of the total login requests to be assigned to server i. For random load dispatching, $p_i(t)$ indicates a probability that a request will be distributed to a server i.

The load balancing component 502 provides a dispatching mechanisms that attempts to equalize numbers of connections on servers in the cluster. The load balancing component 502 applies a round-robin mechanism among a fraction of active servers that have a small number of connections. The load balancing component 502 can employ a proportional load balancing technique that assigns a portion of total load to server i according to the following:

$$p_i(t) = \frac{1}{K(t)} + \alpha\left(\frac{1}{K(t)} - \frac{N_i(t)}{N_{tot}(t)}\right)$$

The parameter $\alpha$ is chosen to be greater than zero and can be tuned to influence the dynamic behavior of the servers. The load balancing component 502, utilizing the proportional load balancing technique assigns larger portions of new connections to servers with relatively small numbers of connections and small portions of new connections to servers with relatively large numbers of connections. It is to be appreciated that, for a particular server i, $p_i(t)$ can be negative. With a negative portion, the load balancing component 502 removes connection load from the server instead of assigning new connections. For example, connections can be moved from one server to another via internal migration within a cluster. In addition, the load balancing component 502 can initiate a disconnect of users and prompt the disconnected users to reconnect to other servers.

Under the load dispatching mechanism provided by the load balancing component 502, every server in a cluster has a same closed-loop dynamics and only vary according to an initial condition. Accordingly, all servers ultimately behave in the same manner as time progresses. Newly turned-on servers (e.g., servers with no connections) will disrupt the uniformity. However, turning off serves does not affect other servers.

The load balancing component 502 can be tuned through selection of the parameter a. For small values of $\alpha$, the load balancing component 502 maintains relatively uniform login rates to all active servers. Under this condition, the load balancing component 502 can be slow in driving the number of connections to uniform on all active servers. For large values of $\alpha$, the load balancing component 502 relies upon disparate login rates across servers and attempts to drive the number of connection on all active servers quickly to a uniform state.

In accordance with another aspect, the load skewing component 504 provides a load skewing dispatching mechanism that operates conversely to the load balancing component 502. The load skewing component 504 attempts to route new login requests to busy servers so long as the busy servers can handle the new requests. A small number of tail servers can be maintained with each tail server managing a small number of connections. When user login requests surge, the load skewing component 504 can utilize the tail servers as a reserve to handle the new requests and provide sufficient time for new servers to be turned on. As new user login requests subside, the tail servers can be slowly drained of connections and shut down to save energy. Under a load skewing mechanism, typically only tails servers are shut down. Accordingly, the number of server initiated disconnections is low.

In addition to the hard bound, $N_{max}$, on the number of connections per server, the load skewing component 504 selects a target number of connections per server, $N_{tgt}$. The target number of connections can be selected to be slightly smaller than the maximum number of connections. The target number provides guidance to the load skewing component 504 when dispatching new user login requests to active servers. The load skewing component 504 distributes new user login requests to servers with loads less than the target but also closest to the target. Once a server reaches the target, no additional connections are assigned to the server until its load drops below the target due to user departures.

In particular, the load skewing component 504 can chose a parameter $\rho$ that is between zero and one. At a given time t, the load skewing component 504 dispatches new connections evenly to a fraction $\rho$ of all available servers. If K(t) represents the total number of available servers at time t, then fraction of servers receiving new connections is given by $\lceil pK(t) \rceil$. The load skewing component partitions a set of available servers into at least two subsets according to the following:

$I_{low}(t)=\{i|N_i(t)<N_{tgt}\}$ $I_{high}(t)=\{i|N_i(t)\geq N_{tgt}\}$

The load skewing component 504 selects the top $\lceil pK(t) \rceil$ servers (e.g., the servers with the highest number of connections) in $I_{low}(t)$. If the number of servers in $I_{low}(t)$ is less than $\lceil pK(t) \rceil$, the load skewing component 504 has at least two options. The load skewing component 504 can distribute new load evenly exclusively to the servers in $I_{low}(t)$. Alternatively, the load skewing component 504 can include the bottom $\lceil pK(t) \rceil$ servers from $I_{high}(t)$. Under the alternative case, the target number of connections is set away from the maximum number of connections to avoid exceeding the maximum. The load skewing component 504 creates a skewed load distribution across the available servers. The majority of available servers have a connection umber close to the target except for a small number of tail servers. According to another aspect, the load skewing component 504 can generate a third partition that includes unnecessary servers that can be shut down to save energy.

The load skewing component 504 facilitates reducing server initiated disconnections when turning off servers. According to another aspect, the load skewing component 504 provides reactive load skewing. In an illustrative embodiment, the reactive load skewing is a hysteresis rule that controls the number of tail servers. Pursuant to this illustration, servers with a number of connections below a threshold, $N_{tail}$ are tail servers. It is to be appreciated that servers can be labeled as busy servers or tail servers depending on whether the servers maintain a number of connections greater than or less than the threshold, respectively. Moreover, the labels can be changed as new connections are dispatched or old connections are closed such that servers transition across the threshold. For example, a busy server can be relabeled as a tail server if it loses enough connections to fall below the threshold. The load skewing component 504 can interact with the provisioning component 106 to maintain a number of tail servers $K_{tail}(t)$. For example, two thresholds $K_{low}$ and $K_{high}$ can be selected. If $K_{tail}(t)$ is below $K_{low}$ then $|(K_{high}-K_{low})/2|-K_{tail}(t)$ servers are turned on. Conversely, if $K_{tail}(t)$ is above $K_{high}$, then $K_{tail}(t)-K_{high}$ servers are turned off. Tail servers maintain a low number of active connections. Turning off tail servers does not create an artificial reconnection surge. In one embodiment, the provisioning of tail servers can occur at the same time scale of the provisioning component 106 (e.g., every half-hour). The load skewing component 504 and/or the provisioning component 104 can save energy by turning off unnecessary tail servers (e.g., tail servers in excess of $K_{high}$).

Figure 6:
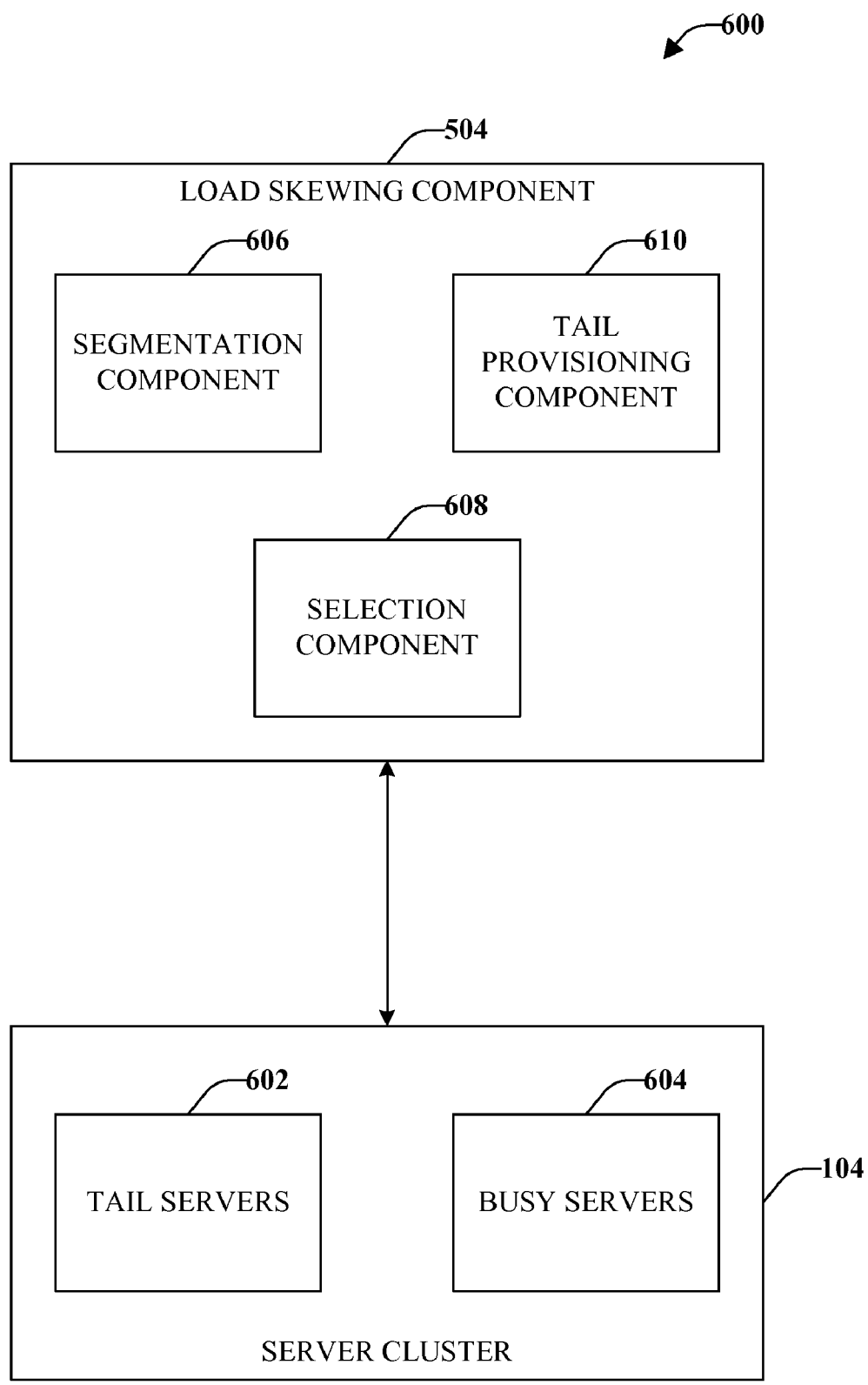
FIG. 6 illustrates a block diagram of an exemplary system that provides a skewed load distribution in a server cluster.

Turning now to FIG. 6, illustrated is a system 600 that provides a skewed load distribution in a server cluster 104. The system 600 includes a detailed load skewing component 504 that creates and maintains the skewed load distribution in the server cluster 104. The server cluster 104 includes a set of tail servers 602 and a set of busy servers 604. Each tail server in the set of tail servers 602 maintains a relatively low number of connections. In an illustrative embodiment, a tail server can be defined to be any server in the server cluster 104 that has a number of connections less than or equal to a tail server threshold $N_{tail}$. Each busy server in the set of busy servers 604 includes a relatively high number of connections. The busy servers 604 can be defined as servers having a number of connections greater than the tail server threshold but less than a target threshold, $N_{tgt}$. According to an aspect, the load skewing component 504 gives priority to a subset of the set of busy server 604 when dispatching new connection requests issued by a plurality of users (not shown). The subset given priority includes busy servers that have a number of connections less than but closest to the target threshold. In addition, the load skewing component 504 can dispatch new connection requests to at least one tail server in the set of tail servers 602 if all servers in the set of busy servers 604 have a number of connections greater than or equal to the target threshold. It is to be appreciated that the set of tail servers and the set of busy servers can be dynamic. For example, tail servers can be labeled as busy servers when the tail servers accumulate more connections than the tail server threshold. In addition, busy servers can be labeled as tail servers when a sufficient number of connections are closed (e.g. users log off) to result in the busy servers dropping below the tail server threshold.

The load skewing component 504 can include a segmentation component 606 that partitions a plurality of available servers in the server cluster 104. An available server is an active server that has not be shut down or placed in a sleep mode. The segmentation component 606 can partition the plurality of available servers in accordance with the target threshold. For example, the segmentation component 606 can generate at least two partitions. One partition can include available servers that that have a number of connections less than the target threshold. This partition can encompasses the set of tail servers 602 and a subset of the set of busy server 604. According to another aspect, the segmentation component 606 can create a second partition that includes available servers that have a number of connections greater than or equal to the target threshold. In addition, the segmentation component 606 can generate a third partition that includes unnecessary servers that can be shut down by the provisioning component 106 to save energy.

The load skewing component 504 can further include a selection component 608 that selects a predetermined number of available servers. The load skewing component 504 can evenly distribute new connection requests among the predetermined number of available servers so long as the new connection requests do not push the servers above the target threshold. The predetermined number of available servers can be a fraction of the plurality of available servers. The fraction can be based upon a configurable parameter. For example, the parameter ρ described supra can provide the fraction. The selection component 608 utilizes the partitions generated by the segmentation component 606 to select the predetermined number of servers. Pursuant to an illustration, the selection component 608 choose a top portion of the partition including servers below the target threshold. The top of the partition includes the servers having the highest number of connections. Accordingly, the top portion are the servers closest to the target threshold. New connection requests are dispatched to this top portion first. Dispatching to busy servers first produces energy savings since it requires more energy to start up new servers than to maintain a fully loaded server. Accordingly, the load skewing component 504 attempts to max out a smallest number of servers as possible instead of utilizing a larger number of servers wherein each server carries a smaller connection load. If there are not enough servers in the partition, the selection component 608 can distribute only among servers in the partition even though less than the predetermined number. Alternatively, the selection server 608 can select a bottom portion of the second partition to meet match the predetermined number. It is to be appreciated that a server is not dispatched further connection requests if the requests require exceeding the target threshold. According to an aspect, the partitions can be reevaluated periodically by the segmentation component 606 to shift servers between partitions as connection numbers change.

The load skewing component 504 can further include a tail provisioning component 610 that manages a size of the set of tail servers 602. In an illustrative embodiment, the tail provisioning component 610 can employ a reactive load skewing hysteresis rule to determine if one or more servers should be started up or shut down. The tail provisioning component 610 can establish an upper bound and a lower bound for the size of the tail servers 602. The tail provisioning component 10 turns on or turns off tail servers in the set of tail servers 602 to keep the size of the set of tail servers 602 within the upper and lower bounds. It is to be appreciated that tail provisioning component 610 can employ the provisioning component 106 to start up and/or shut down tail servers. In addition, the tail provisioning component 610 can be implemented by the provisioning component 106.

Referring back to FIG. 3, the dynamic load component 304 determines dynamic factors for the provisioning component 106 based upon which of the aforementioned dispatching mechanisms is selected by the load dispatching component 108. According to an aspect of the subject disclosure, the dynamic load component 304 evaluates the dynamic factors according to the following when a load balancing mechanism is employed:

$$\gamma_L^{dyn} = 1 + \alpha$$

$$\gamma_N^{dyn} = \frac{1+\alpha}{r+\alpha}$$

Pursuant to this illustration, r is minimum ratio among any time t between $D_{tot}(t)$ and $L_{tot}(t)$ (e.g., the total departures and total logins between time t and t+1). According to an aspect, r is estimated based upon historical data. Tuning the parameter α enables a trade off between login rate and number of connections when determining a number of servers needed. Pursuant to an illustration, the parameter α is selected to makes the login rate and number of connections approximately equal for typical ranges. In accordance with another aspect, the dynamic load component 304 evaluates the dynamic factors according to the following when a load skewing mechanisms is employed:

$$\gamma_L^{dyn} = \frac{1}{\rho}$$

$$\gamma_N^{dyn} = 1 + \frac{K_{tail}}{\min_t N_{tot}(t)/N_{tgt}}$$

Pursuant to this illustration, $K_{tail}$ is the number of tail servers available.

The dynamic factors determined by the dynamic load component 304 in accordance with the selected dispatching mechanism. The factors can be combined with the forecast factors evaluated by the forecast component 302. The provisioning component 106 employs the combination (e.g., the multiplicative factors) to determine a number of servers needed to meet demand. The provisioning component 106 can further include a starvation component 306 that facilitates reducing server initiated disconnections and SNA errors. Pursuant to an illustration, a server disconnects connected users when the provisioning component 106 shuts down the server. Typically, users disconnected by the server attempt an automatic reconnect. A surge of reconnection request can occur and the surge can exceed the maximum login rate sustainable by the server cluster. Accordingly, some users can experience service not available errors. The starvation component 306 mitigates server initiated disconnections and/or SNA errors by draining active connections from servers that are scheduled to be shut down. According to one aspect, the starvation component 306 can schedule a constant disconnection process where the scheduled server slowly disconnects users. The disconnected users can reconnect and a load dispatcher can redirect the users to a different server. Accordingly, the starvation component 306 can remove connections from a server in a controlled manner and prevent a sudden surge in reconnection requests. Pursuant to another illustrative embodiment, the starvation component 306 can starve the server scheduled to be shut down. For example, the starvation component 306 can notify a dispatcher to cease distributing new connection load to the scheduled server and allow currently connected users to naturally disconnect. A starving period can be established by the starvation component 306. Upon expiration of the starving period, server draining, as described above, can commence. The starving period enables a server to naturally reduce connection load before forcefully disconnected users.

Figure 7:
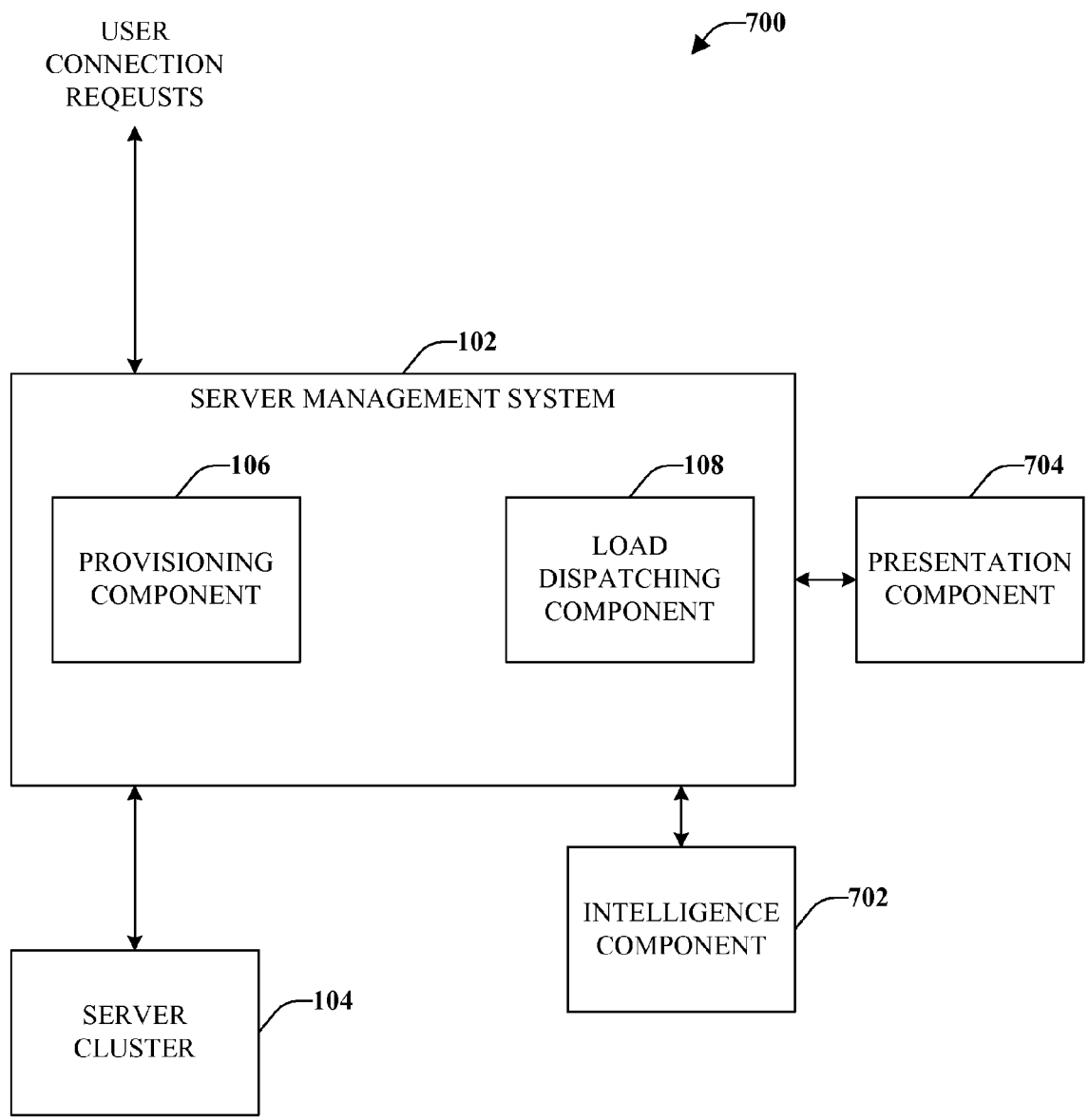
FIG. 7 illustrates a block diagram of an exemplary system that facilitates provisioning servers and dispatching user load in an energy efficient manner.

FIG. 7 illustrates a system 700 that employs intelligence to facilitate provisioning servers to meet demand and dispatching new connection requests to a plurality of servers. The system 700 can include the server management component 102, the provisioning component 106, and the load dispatching component 108. It is to be appreciated that the server management component 102, the provisioning component 106 and/or the load dispatching component 108 can be substantially similar to respective server management components, provisioning components and load dispatching components described in previous figures. The system 700 further includes an intelligence component 702. The intelligence component 702 can be utilized by at least one of the provisioning component 106 or the load dispatching component 108 to facilitate determining a number of servers needed and distributing connection load among available servers. For example, the intelligence component 702 can infer multiplicative factors to be employed in dynamic provisioning based at least in part on historical data (e.g., historical model of login rates and/or connection numbers). Moreover, the intelligence component 702 can infer values for various parameters that adjust the behavior of the provisioning and dispatching systems. For instance, the intelligence component 702 can determine an appropriate value for the parameter α employed in load balancing and/or an appropriate value for the parameter ρ utilized in the load skewing dispatching mechanism. Further, the intelligence component 702 can infer optimal settings and/or configurations related to system 700. Pursuant to an illustration, the intelligence component 702 can determine an optimal load dispatching mechanism based upon the Internet service deployed on the servers, desired service quality, the login rate, the number of connections, etc.

The intelligence component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The system 700 can further utilize a presentation component 704 that provides various types of user interfaces to facilitate interaction with the server management component 102, the provisioning component 106 and/or the load dispatching component 108. As depicted, the presentation component 704 is a separate entity that can be utilized with other components. However, it is to be appreciated that the presentation component 704 and/or similar view components can be incorporated into with the server management component 102, the provisioning component 106, the load dispatching component 108 and/or a stand-alone unit. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into at least one of the provisioning component 106 or the load dispatching component 108.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

FIGS. 8-13 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
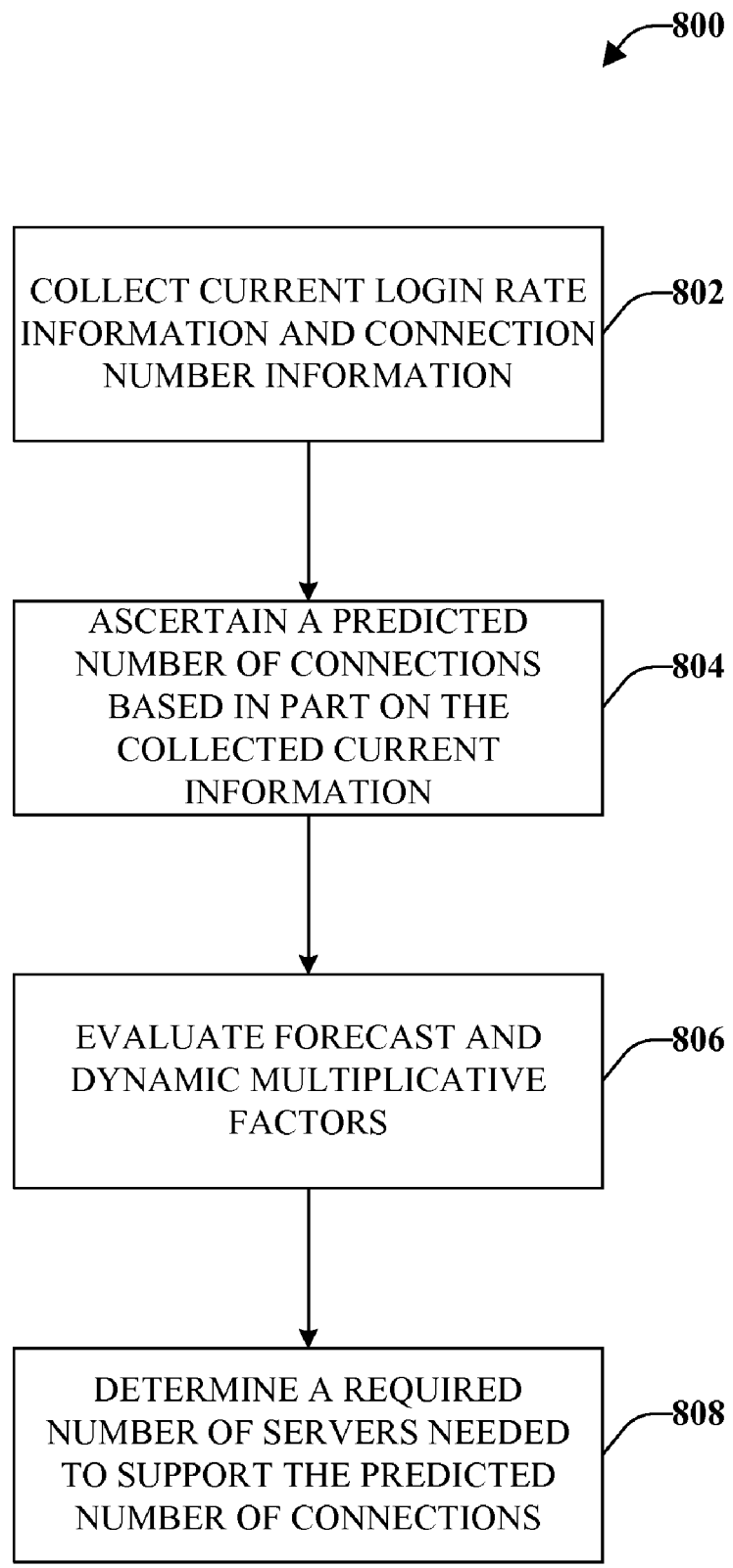
FIG. 8 illustrates an exemplary methodology that facilities provisioning servers in a connection-intensive network service.

FIG. 8 illustrates a method 800 that facilitates provisioning servers in a connection-intensive network service. At reference numeral 802, current login rate and connection number information is collected. The current login rate and connection number information can include a total login rate and total number of connections, respectively, for a plurality of servers deploying the connection intensive network service. At reference numeral 804, a predicted number of connections and/or login rate at a future time is ascertained based in part on the collected current information. At reference numeral 806, multiplicative factors are evaluated. The multiplicative factors provide a margin in provision servers to account for inaccuracy in the predicted number of connections and/or login. The multiplicative factors also provide the margin to adjust for dynamic behaviors that result from load dispatching. The multiplicative factors include a factor for login rate and a factor for number of connections. Further, the multiplicative factors can be deconstructed into a forecast factors component and a dynamic factors component. At reference numeral 808, a required number of servers needed is determined. The required number is ascertained based in part on the predicted connection numbers and login rate in view of maximum bounds for each individual server. The determined number of servers includes an additional margin provided by the multiplicative factors.

Figure 9:
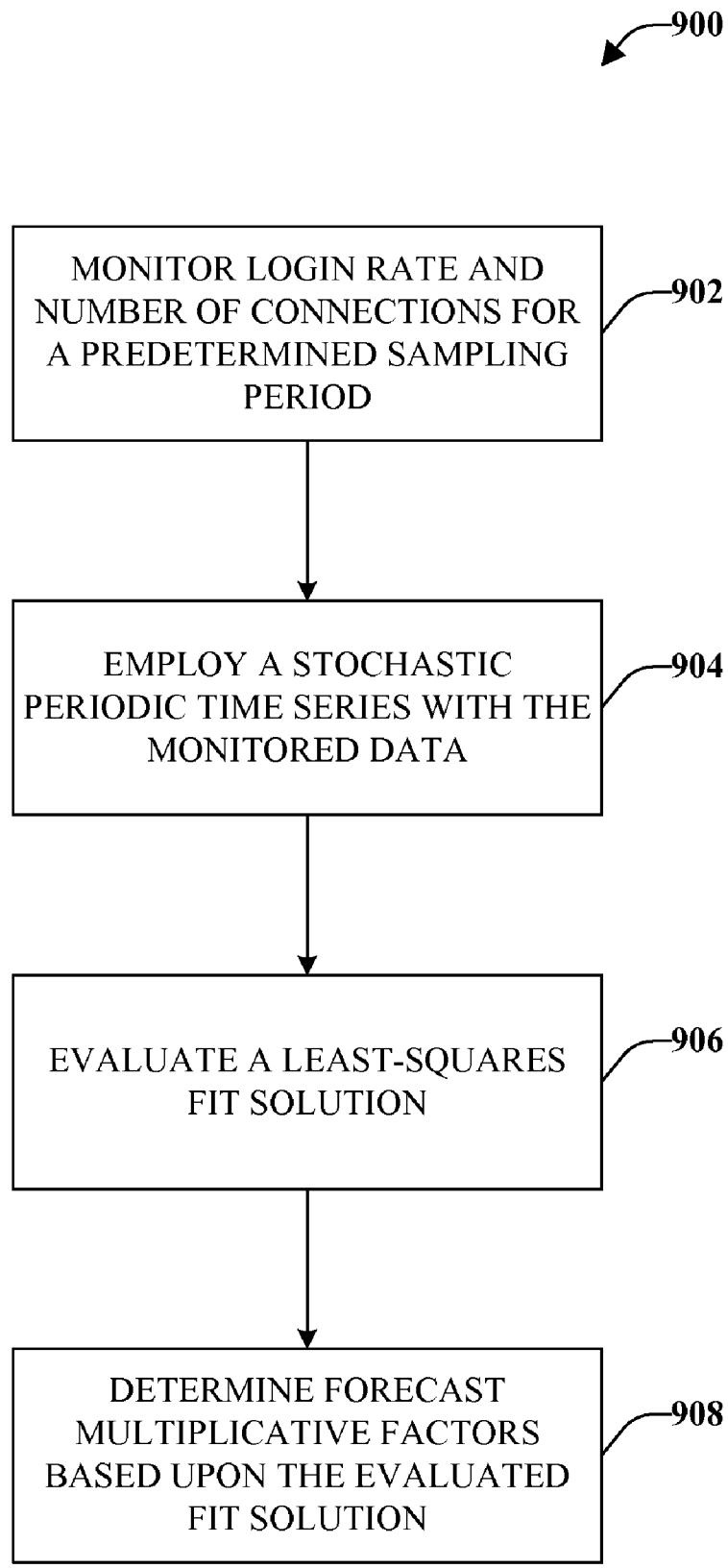
FIG. 9 illustrates an exemplary methodology that facilitates determining forecast factors employed to provision servers.

FIG. 9 illustrates a method 900 that facilitates determining forecast factors employed to provision servers. The forecast factors are one component of the multiplicative factors described in reference to FIG. 8. At reference numeral 902, login rates and number of connections for a plurality of servers are monitored for a predetermined sampling period. At reference numeral 904, a stochastic periodic time series is employed with the monitored data. The stochastic periodic time series can model the seasonal or periodic components of the login rate and number of connections in the plurality of servers. At reference numeral 906, a least squares fit solution is evaluated. The least squares fit solution produces values for unknown variables needed to complete the stochastic periodic time series model. At reference numeral 908, the forecast multiplicative factors are determined based upon the evaluated fit solution. In accordance with an aspect, predicted values ascertained with the stochastic periodic time series model are compared to actual observed values. The standard deviations of errors are utilized to generate the multiplicative forecast factors.

Figure 10:
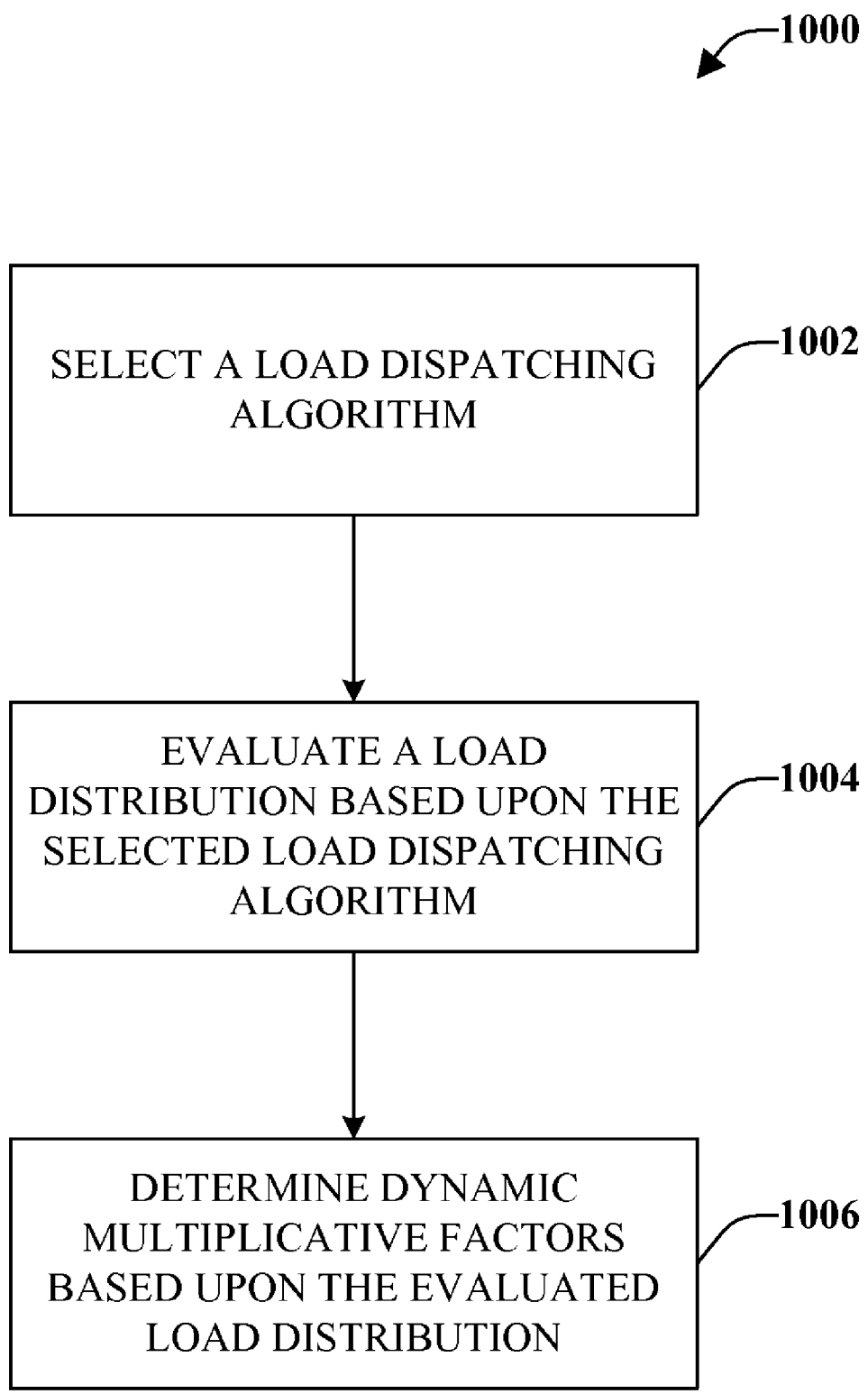
FIG. 10 illustrates an exemplary methodology that facilitates ascertaining dynamic factors employed to provision servers.

FIG. 10 illustrates a method 1000 that facilitates ascertaining dynamic factors employed to provision servers. The dynamic factors are one component of the multiplicative factors described in reference to FIG. 7. At reference numeral 1002, a load dispatching algorithm is selected. The load dispatching algorithm can be one of a load balancing algorithm or a load skewing algorithm. The load balancing algorithm attempts to equalize numbers of connections on a plurality of servers. The load skewing algorithm gives assignment priority to busy servers near a maximum number of connections. At reference numeral 1004, a load distribution based upon the selected load dispatching algorithm is evaluated. At reference numeral 1006, dynamic multiplicative factors are determined based upon the evaluated load distribution.

Figure 11:
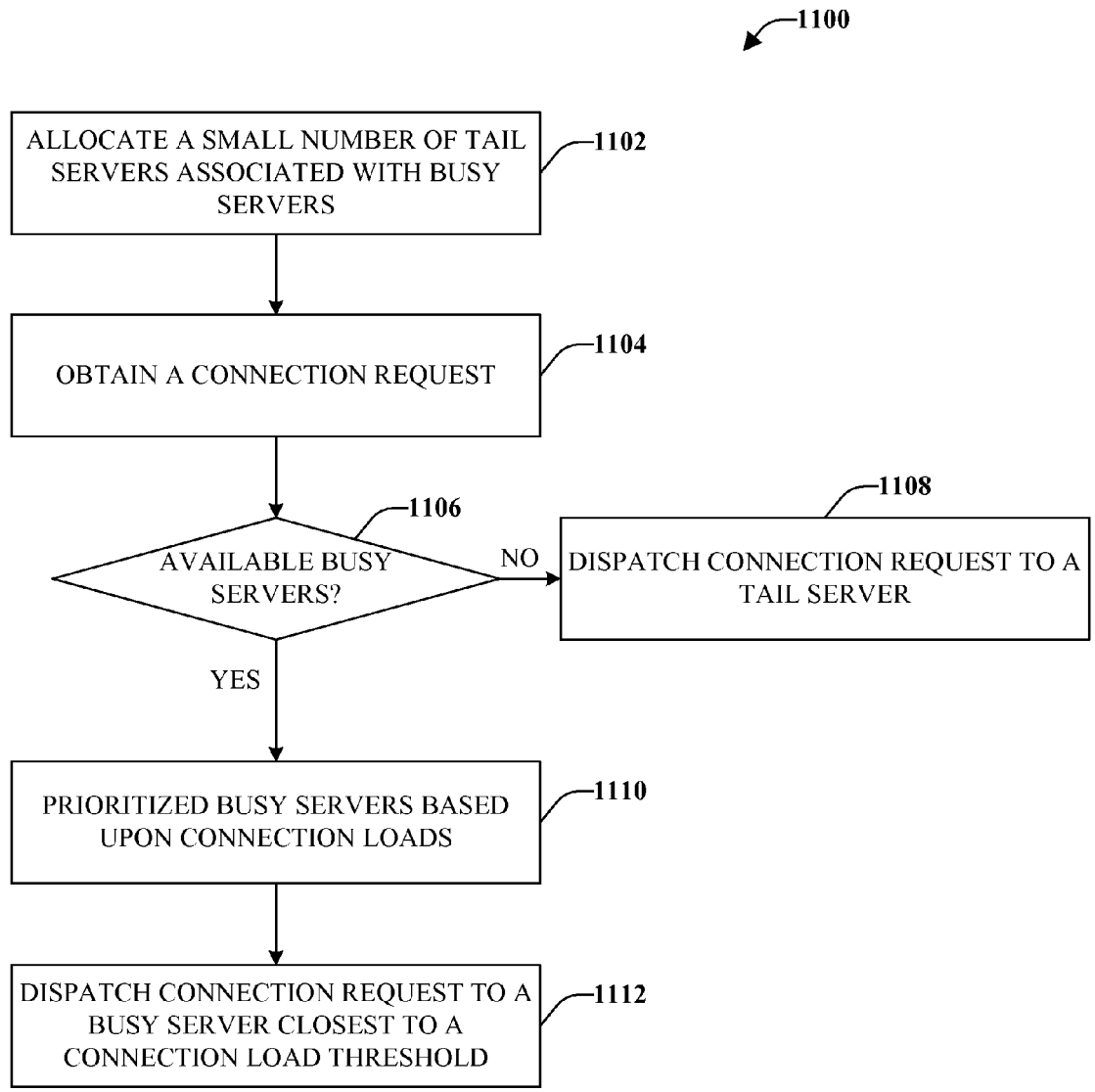
FIG. 11 illustrates an exemplary methodology that facilitates distributing user load to a set of servers to limit energy consumption.

FIG. 11 illustrates a method 1100 that facilitates distributing user load to a set of servers to limit energy consumption. The method 1100 can be employed by a connection intensive network service that includes a plurality of servers. At reference numeral 1102, a small number of tail servers are allocated in association with a set of busy servers. Busy servers have a relatively large number of active connections and tail servers have a relatively small number of active connections. At reference numeral 1102, a connection request is obtained. Pursuant to an illustration, the connection request can issue from a user desiring to consume the network service. At reference numeral 1106, a determination is made as to whether any busy servers are available to accept an additional connection. If no busy servers are available, the obtained connection request is dispatched to a tail server at reference numeral 1108. If at least one busy server is available, the method 1100 proceed to reference numeral 1110 where all available busy servers are prioritized based upon connection loads. For example, the set of busy servers can be split into two subsets where one subset includes busy servers below a target number of connections and one subset includes busy servers above or equal to the target number of connections. At reference numeral 1112, the obtained connection request is dispatched to a busy server in the subset below the target number. In accordance with an aspect, the busy server is the server closest to the target number of connections.

Figure 12:
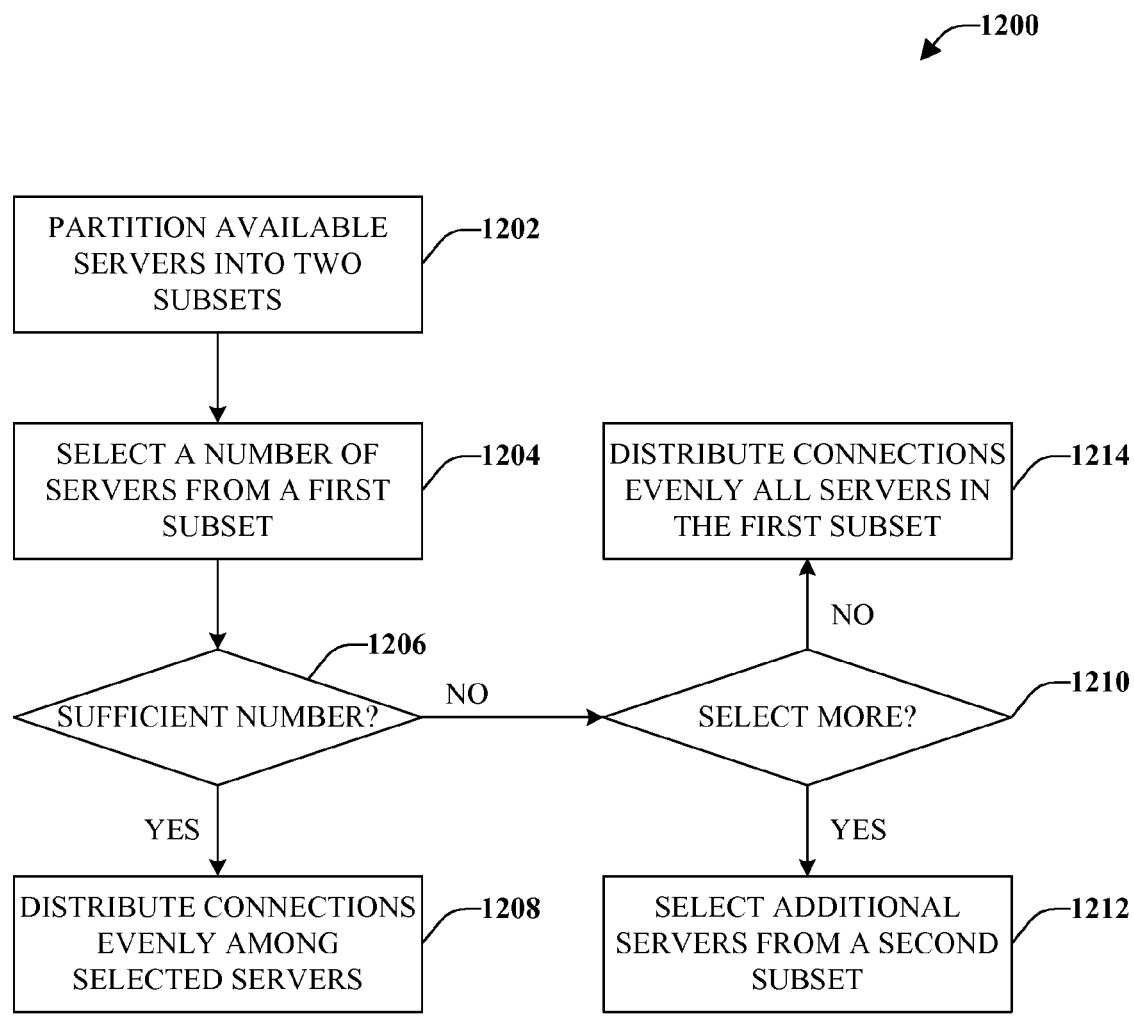
FIG. 12 illustrates an exemplary methodology that facilitates producing a skewed load distribution among a plurality of servers in cluster.

FIG. 12 illustrate a method 1200 that facilitates producing a skewed load distribution among a plurality of servers in cluster. At reference numeral 1202, available servers are partitioned in two subsets. The available servers are servers that are active and not scheduled to be shut down or put into a sleep mode. At reference numeral 1204, a number of servers from a first subset are selected. The first subset includes available servers that have a number of connections below a target threshold. At reference numeral 1206, a determination is made as to whether the first subset includes a sufficient number of servers to meet the desired number to be selected. If yes, the method 1200 proceeds to reference numeral 1208 where new connection requests are distributed evenly among the selected servers. If the first subset does not include a sufficient number, the method 1200 proceeds to reference numeral 1210 where a decision is made as to whether to select more servers. If yes, the method 1200 proceeds to reference numeral 1212 where additional servers are selected from a second subset until the desired number is achieved. The second subset includes servers that have a number of connections greater than or equal to the target threshold. If more servers are not to be selected, the method 1200 proceeds to reference numeral 1214 where new connection requests are distributed evenly among only the servers in the first subset.

Figure 13:
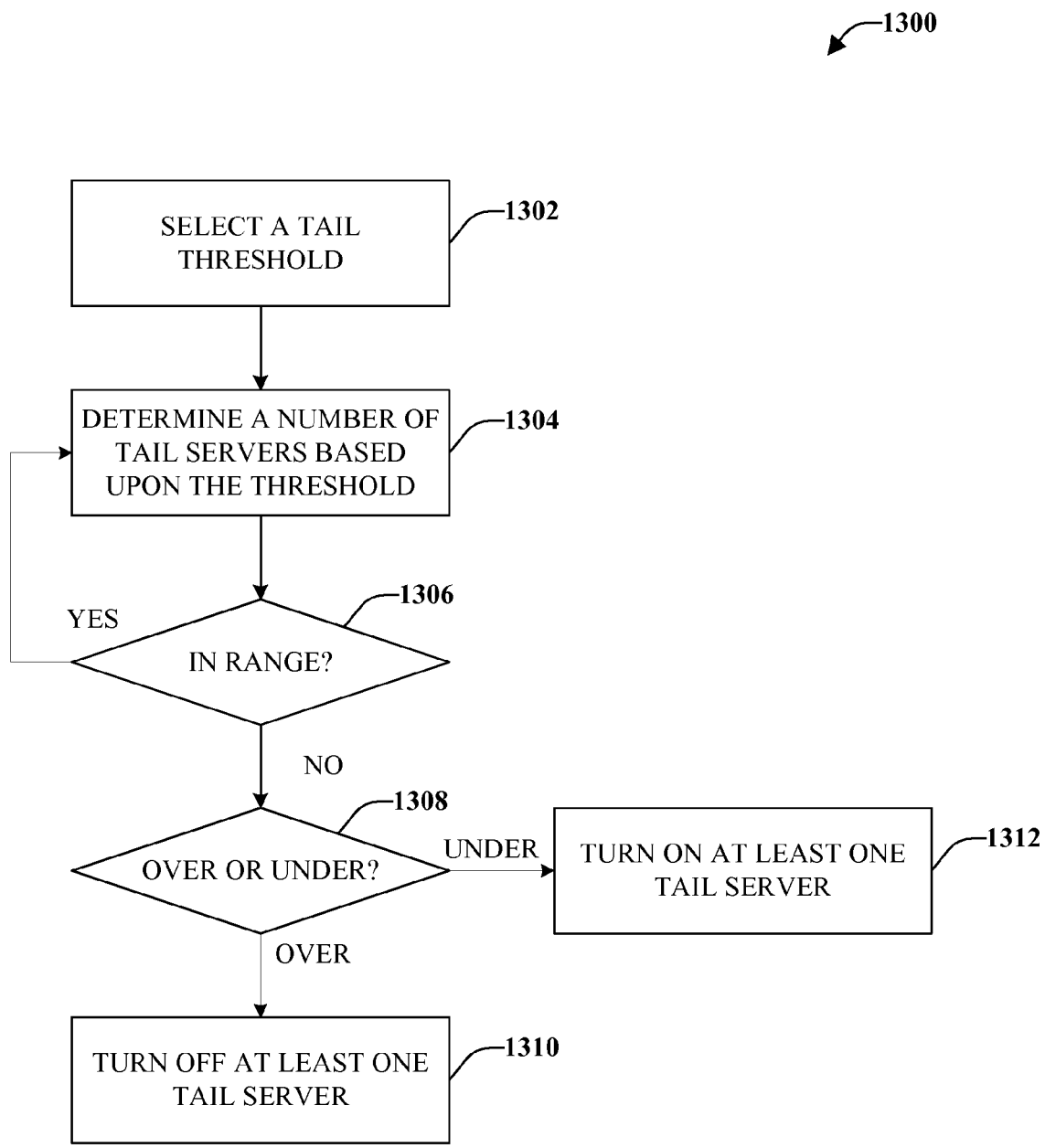
FIG. 13 illustrates an exemplary methodology that facilitates provision tail servers in a load skewing distribution.

FIG. 13 illustrates a method 1300 that facilitates provision tail servers in a load skewing distribution. At reference numeral 1302, a tail threshold is selected. The tail threshold indicates a maximum number of connections a server can retain to be considered a tail server. At reference numeral 1304, a number of tail servers is determined based upon the selected tail threshold. At reference numeral 1306, a determination is made as to whether the number of tail servers in within a range. A lower and an upper bound on the number of desired tail servers can give the range. If the number of servers is in range, the method 1300 proceeds back to reference numeral 1304 where in the number is recalculated. As time progresses, users can naturally disconnect from a server causing a new server to be included as a tail server. In addition, tail servers can be assigned new connections which can result in the tail server exceeding the threshold. If the number of servers is not in range, the method 1300 proceeds to reference numeral 1308 where a determination is made to whether the number of tail servers exceeds or falls under the range. If the number of tail servers exceed the range, the method 1300 proceeds to reference numeral 1310 where at least one tail server is shut down to bring the number back within range. If the number of tail servers falls under the range, the method 1300 proceeds to reference numeral 1312 where at least one tail server is started up to bring the number up into range.

Figure 14:
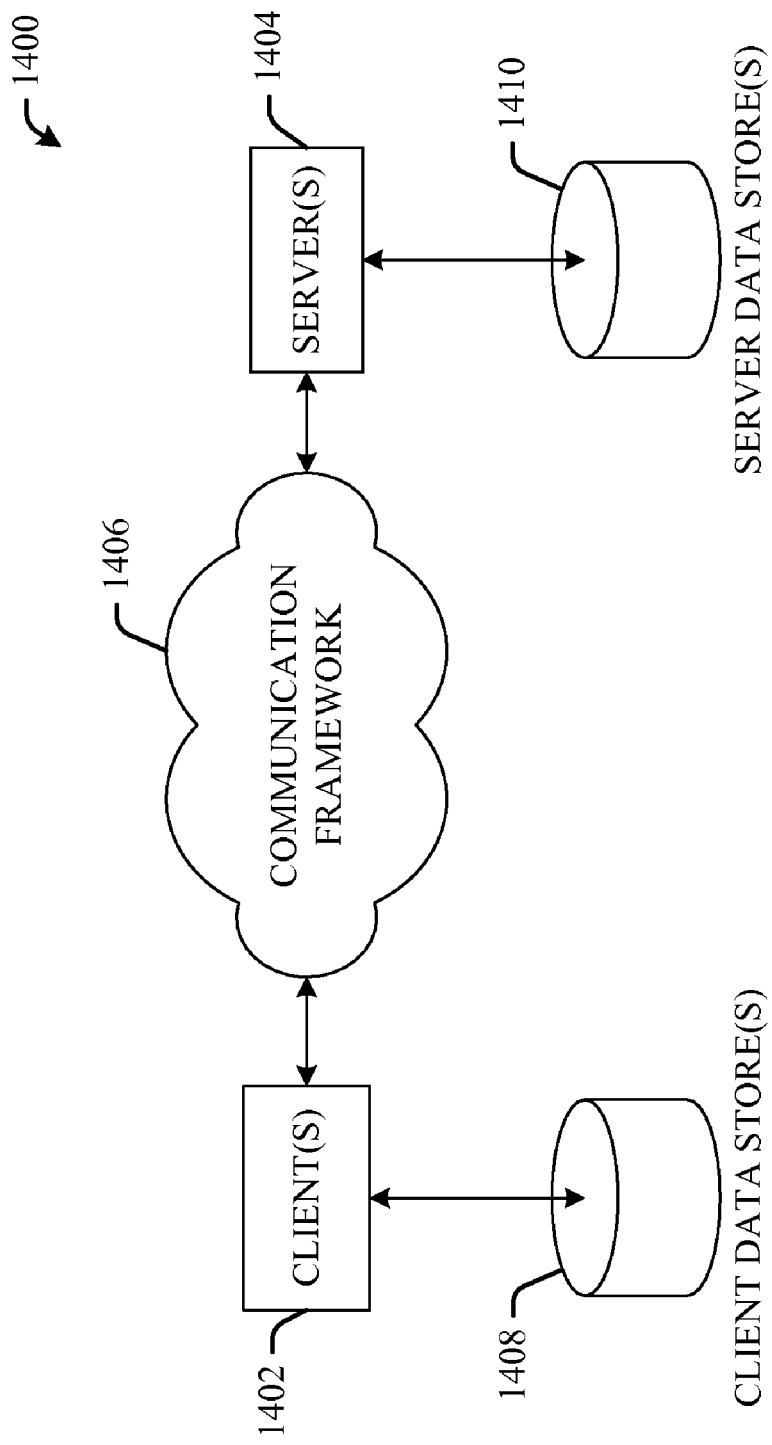
FIG. 14 is a schematic block diagram illustrating a suitable operating environment.
Figure 15:
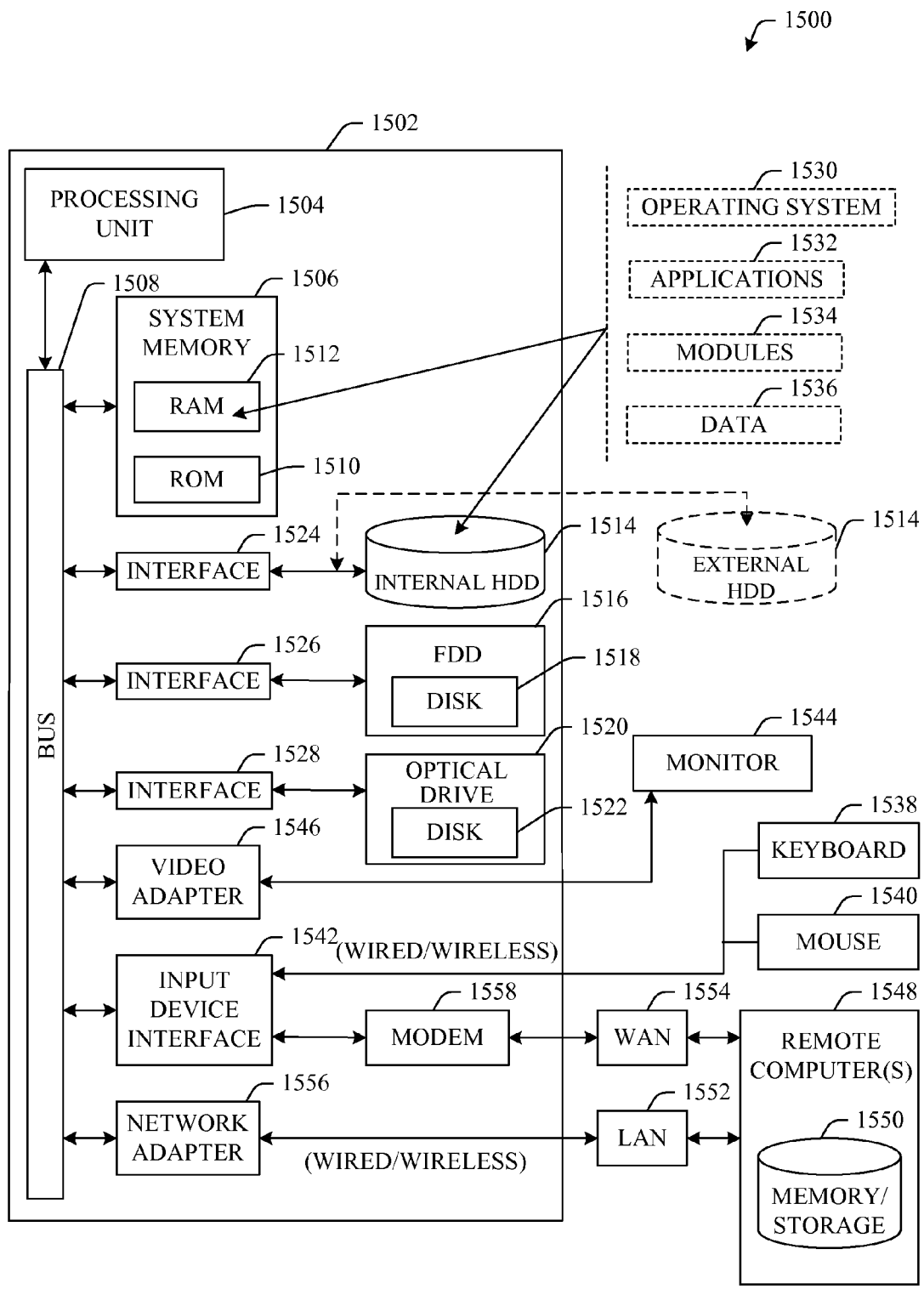
FIG. 15 is a schematic block diagram of a sample computing environment.

In order to provide a context for the various aspects of the disclosed subject matter, FIGS. 14 and 15 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 14, there is illustrated a schematic block diagram of a computing environment 1400 in accordance with the subject specification. The system 1400 includes one or more client(s) 1402. The client(s) 1402 can be hardware and/or software (e.g., threads, processes, computing devices). The client(s) 1402 can house cookie(s) and/or associated contextual information by employing the specification, for example.

The system 1400 also includes one or more server(s) 1404. The server(s) 1404 can also be hardware and/or software (e.g., threads, processes, computing devices). The servers 1404 can house threads to perform transformations by employing the specification, for example. One possible communication between a client 1402 and a server 1404 can be in the form of a data packet adapted to be transmitted between two or more computer processes. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

Referring now to FIG. 15, there is illustrated a block diagram of a computer operable to execute the disclosed architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the specification can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system configured to facilitate an energy-aware connection distribution among a plurality of servers in a cluster, the computer-implemented system comprising:
  a processor;
  a plurality of busy servers in the cluster configured to handle a high number of connections;
  a plurality of tail servers in the cluster configured to maintain a low number of connections, the low number of connections being lower than the high number of connections;
  a load skewing component configured to give priority to at least a subset of the plurality of busy servers as a function of dispatch of new connection requests, the subset of the plurality of busy servers given priority having a number of connections less than and near a target threshold number of connections, the load skewing component comprising a segmentation component configured to generate partitions, a first partition and a second partition of the partitions being ranked top to bottom based, at least, on a number of connections, wherein a highest ranking one of the plurality of busy servers retains a target threshold number of connections closest to the target threshold;
  a provisioning component configured to:
    shut down unnecessary servers in the cluster to save energy and start up servers in the cluster to meet demand based, at least, on a rate of login to the plurality of busy servers in the cluster; and
    forecast factors utilized to determine a number of the plurality of busy servers to provision for a service via a sparse periodic auto-regression model of at least one of the plurality of busy servers; and
  a computer-readable storage medium storing instructions that, when executed by the processor, cause the processor to implement at least one of the load skewing component or the provisioning component.

2. The computer-implemented system of claim 1, wherein the load skewing component is further configured to dispatch new connection requests to at least one tail server in the plurality of tail servers in response to all of the plurality of busy servers having a number of connections greater than or equal to the target threshold number of connections.

3. The computer-implemented system of claim 1, wherein a segmentation component is further configured to partition a plurality of available servers in the cluster based, at least, on the target threshold number of connections, the plurality of available servers including active servers.

4. The computer-implemented system of claim 3, wherein the partitions include at least three partitions, a first partition comprising servers that include a number of connections less than the target threshold number of connections, a second partition comprising servers that include a number of connections greater than or equal to the target threshold number of connections and a third partition including unnecessary servers to be shut down by the provisioning component.

5. The computer-implemented system of claim 4, wherein the load skewing component further comprises a selection component configured to select a predetermined number of available servers to evenly receive new connection requests.

6. The computer-implemented system of claim 5, wherein the predetermined number of available servers comprises a fraction of the plurality of available servers, and the fraction is determined based, at least, on a configurable parameter.

7. The computer-implemented system of claim 5, wherein the selection component is configured to select the predetermined number of available servers from a top of the first partition in response to the predetermined number of available servers meeting a condition with respect to a size of the first partition, the top of the first partition including servers with a highest number of connections in the first partition.

8. The computer-implemented system of claim 7, wherein the selection component is further configured to evenly distribute new connection requests to all servers in the first partition based, at least, on the number of connections on any server in the first partition not exceeding the target threshold number of connections after accepting a new connection.

9. The computer-implemented system of claim 7, wherein the selection component is further configured to select the predetermined number of available servers from a bottom portion of the second partition based on the predetermined number of available servers that exceeds the size of the first partition.

10. The computer-implemented system of claim 1, wherein the tail provisioning component is configured to facilitate managing the plurality of tail servers.

11. The computer-implemented system of claim 10, wherein the tail provisioning component is configured to apply a reactive load skewing hysteresis rule to determine that one or more of the plurality of tail servers are to be turned on or turned off by the provisioning component.

12. The computer-implemented system of claim 10, wherein the tail provisioning component is configured to set a lower threshold and a higher threshold and a number of the plurality of tail servers is maintained between the lower threshold and the higher threshold, the lower threshold and the higher threshold being different values from one another.

13. A computer-implemented method that facilitates energy-aware connection distribution among a plurality of servers in a cluster, the computer-implemented method comprising:
  executing on a processor, computer-executable instructions that, when executed, cause operations to be performed, comprising:
    allocating a plurality of tail servers in association with a plurality of busy servers, wherein the plurality of tail servers include servers that maintain a low number of active connections and the plurality of busy servers include servers that maintain a high number of active connections higher than the low number;

employing a sparse periodic auto-regression model of at least one of the plurality of busy servers to forecast factors utilized to determine a number of the plurality of busy servers to provision for a service;

provisioning tail servers to maintain a number of tail servers between an upper bound and a lower bound, wherein the provisioning of tail servers comprises turning on tail servers in response to a number of tail servers being below a lower bound and turning off tail servers in response to the number of tail servers being above an upper bound, the upper bound being higher than the lower bound, the provisioning being based, at least, on a login rate for the plurality of busy servers;

obtaining one or more connection requests;

determining whether a subset of the plurality of busy servers have a first number of connections below a target threshold;

prioritizing the subset of the plurality of busy servers based, at least, on a number of connection loads; and dispatching the one or more connection requests to a busy server of the plurality of busy servers, with the busy server having a highest priority among the plurality of busy servers.

14. The computer-implemented method of claim 13, further comprising dispatching the one or more connection requests to the plurality of tail servers based, at least, on determining that no subset of the plurality of busy servers has the first number of connections below the target threshold.

15. The computer-implemented method of claim 13, wherein the prioritizing the subset of the plurality of busy servers comprises ranking servers based, at least, on a proximity to the target threshold, wherein a highest ranking server retains a second number of connections closest to the target threshold.

16. The computer-implemented method of claim 13, further comprising establishing a tail threshold and identifying, as tail servers, the cluster servers that maintain a third number of connections less than or equal to the tail threshold.

17. The computer-implemented method of claim 16, further comprising:

identifying tail servers as busy servers when the tail servers accumulate more connections than the tail threshold; and identifying a plurality of busy servers as tail servers based, at least, on a fourth number of connections of the busy servers dropping below the tail threshold.

18. One or more computer storage media, not consisting of signals, storing computer-executable instructions, that, when executed by a computing device, cause the computing device to perform operations, comprising:

maintaining a plurality of busy servers configured to handle a high number of connections;

forecasting factors utilized to determine a number of the plurality of busy servers to provision for a service, the forecasting comprising employing a sparse periodic auto-regression model of at least one of the plurality of busy servers;

provisioning a plurality of tail servers on the forecasting; adjusting a number of the plurality of tail servers to be between an upper bound and a lower bound, the provisioning being performed on substantially a same time scale as the adjusting;

partitioning servers into a first partition and a second partition, the first partition including the plurality of tail servers and a subset of the plurality of busy servers that includes connection loads below a target, and the second partition including busy servers having connection loads above the target;

selecting a predetermined number of servers from the first partition; and evenly distributing new connection requests issued from a plurality of users to the predetermined number of servers within the first partition.

* * * * *